United States Patent
Shinohara et al.

(10) Patent No.: US 11,880,016 B2
(45) Date of Patent: Jan. 23, 2024

(54) LIGHT EMITTING DEVICE

(71) Applicant: NICHIA CORPORATION, Anan (JP)

(72) Inventors: Yoshinori Shinohara, Chino (JP); Kosuke Gomi, Suwa-gun (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/223,531

(22) Filed: Apr. 6, 2021

(65) Prior Publication Data

US 2021/0318484 A1    Oct. 14, 2021

(30) Foreign Application Priority Data

Apr. 10, 2020  (JP) ................. 2020-071263

(51) Int. Cl.
*F21V 8/00* (2006.01)
*F21V 23/00* (2015.01)
(Continued)

(52) U.S. Cl.
CPC .......... *G02B 6/0058* (2013.01); *F21V 23/003* (2013.01); *G02B 6/0041* (2013.01); *G02B 6/0078* (2013.01); *G02B 6/0086* (2013.01); *F21V 19/0055* (2013.01); *F21Y 2105/10* (2016.08); *F21Y 2115/10* (2016.08)

(58) Field of Classification Search
CPC .. G02B 6/0058; G02B 6/0041; G02B 6/0078; G02B 6/0086; F21V 23/003; F21V 19/0055; F21Y 2105/10; F21Y 2115/10
See application file for complete search history.

(56) References Cited

U.S. PATENT DOCUMENTS 5,764,845 A  *  6/1998  Nagatani .............. G02B 6/0006
                                                       385/88
7,258,474 B2    8/2007  Valcamp et al.
(Continued)

FOREIGN PATENT DOCUMENTS

DE   102013201950 A1 *  8/2014  ............ F21V 7/0083
EP       2472177 A2  *  7/2012  ............ F21V 13/04
(Continued)

OTHER PUBLICATIONS

Japanese Office Action for Japanese Application No. 2020-071263, dated Jun. 14, 2022, with an English translation.

*Primary Examiner* — Fatima N Farokhrooz
(74) *Attorney, Agent, or Firm* — Birch, Stewart, Kolasch & Birch, LLP

(57) ABSTRACT

A light emitting device includes multiple light source parts each including at least one first light source part and at least one second light source part, each including a light emitting element and a light-guiding member to guide light of the light emitting element. Each light-guiding member has a taper shape narrowing toward the light emitting element. Light from each light source part satisfies condition of $\theta \leq \alpha \leq \tan^{-1} \times 2 \tan \theta$. ($\theta$ is an angle of a straight line connecting a position on the light-irradiation surface having an illuminance of at least one-half of that at center position and the center of the light emitting surface of the first light source part, and $\alpha$ is an angle of a straight line connecting a center of a light-irradiation region on a light-irradiation surface and a center of the light emitting surface of the second light source part.)

16 Claims, 23 Drawing Sheets

(51) Int. Cl.
*F21V 19/00* (2006.01)
*F21Y 115/10* (2016.01)
*F21Y 105/10* (2016.01)

(56) References Cited

U.S. PATENT DOCUMENTS

| | | |
|---|---|---|
| 7,563,009 B2 | 7/2009 | Valcamp et al. |
| 7,581,860 B2 | 9/2009 | Bogner et al. |
| 7,815,350 B2 | 10/2010 | Valcamp et al. |
| 8,408,721 B2 | 4/2013 | Auerbach et al. |
| 8,899,782 B2 | 12/2014 | Sikkens et al. |
| 9,046,237 B2 | 6/2015 | Stefanov et al. |
| 9,217,554 B1* | 12/2015 | Schertler ............ F21V 5/08 |
| 9,239,141 B1* | 1/2016 | Schertler ............ F21V 5/08 |
| 9,243,771 B2 | 1/2016 | Jungwirth et al. |
| 9,618,174 B2 | 4/2017 | Jungwirth et al. |
| 9,746,150 B2 | 8/2017 | Bauer et al. |
| 9,879,835 B2 | 1/2018 | Taudt et al. |
| 9,915,405 B2 | 3/2018 | Maier et al. |
| 10,139,068 B2 | 11/2018 | Plank et al. |
| 10,208,912 B2 | 2/2019 | Taudt et al. |
| 10,527,248 B2 | 1/2020 | Taudt et al. |
| 2008/0074032 A1* | 3/2008 | Yano ............ F21S 6/003 445/35 |
| 2008/0094460 A1* | 4/2008 | Nakata ........... B41J 11/00214 347/102 |
| 2011/0141442 A1* | 6/2011 | Auerbach ........ G03B 21/147 353/94 |
| 2012/0318066 A1* | 12/2012 | Ichihara ........ G01N 21/1702 73/655 |
| 2013/0135856 A1* | 5/2013 | Arai ............... F21V 14/06 362/231 |
| 2015/0192264 A1 | 7/2015 | Holzl et al. |
| 2016/0147061 A1* | 5/2016 | Nambara .......... B60K 35/00 359/631 |
| 2016/0273721 A1* | 9/2016 | Pijlman ............ F21S 8/086 |
| 2016/0368414 A1* | 12/2016 | Son ............... F21S 41/663 |
| 2018/0010755 A1* | 1/2018 | Park ............... B60Q 1/085 |
| 2018/0031200 A1* | 2/2018 | Park ............... F21S 41/141 |
| 2020/0326044 A1* | 10/2020 | Haenen ........... H05B 47/155 |
| 2021/0227668 A1* | 7/2021 | Nakamura ........ H05B 47/155 |

FOREIGN PATENT DOCUMENTS

| | | |
|---|---|---|
| JP | 2005-292561 A | 10/2005 |
| JP | 2006-521667 A | 9/2006 |
| JP | 2007-288169 A | 11/2007 |
| JP | 2009-218211 A | 9/2009 |
| JP | 2009-272307 A | 11/2009 |
| JP | 2012-9154 A | 1/2012 |
| JP | 2012-500411 A | 1/2012 |
| JP | 2012-79643 A | 4/2012 |
| JP | 2012-164626 A | 8/2012 |
| JP | 2013-524426 A | 6/2013 |
| JP | 2013-211198 A | 10/2013 |
| JP | 2014-143200 A | 6/2014 |
| JP | 2014-522083 A | 6/2014 |
| JP | 2014-524115 A | 9/2014 |
| JP | 5624642 B2 * | 11/2014 |
| JP | 2015-88410 A | 5/2015 |
| JP | 2015-524600 A | 8/2015 |
| JP | 2015-526868 A | 9/2015 |
| JP | 2016-505198 A | 2/2016 |
| JP | 2016-535402 A | 11/2016 |
| JP | 2016-212962 A | 12/2016 |
| JP | 2017010676 A * | 1/2017 |
| JP | 2017-111341 A | 6/2017 |
| JP | 2018-25674 A | 2/2018 |
| JP | 2018-526805 A | 9/2018 |
| JP | 2018-527723 A | 9/2018 |
| JP | 2018-533189 A | 11/2018 |
| WO | WO 2005/104247 A1 | 11/2005 |
| WO | WO 2016/072484 A1 | 5/2016 |

* cited by examiner

Length of one side of rectangular shape of light-exiting surface: S2 (mm)

LIGHT EMITTING DEVICE

CROSS-REFERENCE TO RELATED PATENT APPLICATION

The present application claims priority under 35 U. S. C. § 119 to Japanese Patent Application No. 2020-071263, filed Apr. 10, 2020. The contents of Japanese Patent Application No 2020-071263 are incorporated herein by reference in their entirety.

BACKGROUND

Technical Field

The present disclosure relates to a light emitting device.

Description of Related Art

There have been known light emitting devices that allow controlling of light distribution to walls and floors, and to signboards, of stores/facilities etc., for the purpose of space rendering. For example, JP 2015-088410 describes a light emitting device having a plurality of LED elements configured to emit light and a plurality of rods each being configured to direct light emitted from a corresponding one of the plurality of LED elements. The light-exiting surfaces of the plurality of rods are arranged in close proximity, in contact with each other, or formed integrally with each other, into a certain form (for example, see JP 2015-088410A).

SUMMARY

However, the devices such as illustrated in JP 2015-088410A may not be able to easily form a variety of light distribution patterns.

Accordingly, an object of the present disclosure is to make it easy to form a variety of light distribution patterns.

A light emitting device includes a plurality of light source parts each being configured to emit an irradiation light, the plurality of light source parts including at least one first light source part and at least one second light source part; each of the at least one first light source part including a first light emitting element having a first light emitting surface and a first light-guiding member configured to guide light emitted from the first light emitting element; each of the at least one second light source part including a second light emitting element having a second light emitting surface and a second light-guiding member configured to guide light emitted from the second light emitting element; each of the at least one first light-guiding member having a tapered shape narrowing toward the first light emitting element; and each of the at least one second light-guiding member having a tapered shape narrowing toward the second light emitting element.

The irradiation light emitted from each of the at least one first light source part and the irradiation light emitted from each of the at least one second light source part satisfy condition (1)

$$\theta \leq \alpha \leq \tan^{-1} \times 2 \tan \theta \quad (1)$$

($\theta$ is an angle between an imaginary straight line connecting a position of center of a light-irradiation region on a light-irradiation surface of the irradiation light emitted from each of the at least one first light source part and a center of the first light emitting surface of the first light source part, and an imaginary straight line connecting a position on the light-irradiation surface having an illuminance of at least one-half of an illuminance at center position of the corresponding one of the at least one first light source part and the center of the first light emitting surface of the first light source part, and $\alpha$ is an angle between the imaginary straight line connecting the position of center of the light-irradiation region on the light-irradiation surface of the irradiation light emitted from the corresponding one of the at least one first light source part and the center of the first light emitting surface of the corresponding one of the at least one first light source part, and an imaginary straight line connecting a position of center of a light-irradiation region on a light-irradiation surface of the irradiation light emitted from each one of the at least one second light source part and a center of the second light emitting surface of the second light source part.)

According to one embodiment of the present disclosure, various light distribution patterns can be easily formed.

BRIEF DESCRIPTION OF THE DRAWINGS

FIG. 1A is a perspective view taken from the light emitting side, and FIG. 1B is a perspective view taken from the opposite side of the light emitting side.

FIG. 3A is a plan view, FIG. 3B is a cross-sectional view seen from the arrow direction of the A-A line of FIG. 3A, and FIG. 3C is a perspective view of a narrow-angle light guide member.

FIG. 4A is a plan view, FIG. 4B is a cross-sectional view seen from the arrow direction of the B-B line of FIG. 4A, and FIG. 4C is a perspective view of a wide-angle light guide member.

FIG. 9A illustrates a relationship between light irradiation and a light-irradiation region, and FIG. 9B shows a simulated illuminance distribution on the light-irradiation surface.

FIG. 10A illustrates a relationship between light irradiation and a light-irradiation region, and FIG. 10B shows a simulated illuminance distribution on the light-irradiation surface.

FIG. 12A illustrates the overlapping of the irradiation light, FIG. 12B is a plan view illustrating an overlapping of the light-irradiation regions, and FIG. 12C illustrates a sectional illuminance distribution.

FIG. 13A illustrates the overlapping of the irradiation light, FIG. 13B is a plan view illustrating an overlapping of the light-irradiation regions, and FIG. 13C illustrates a sectional illuminance distribution.

FIG. 20A is a diagram illustrating a narrow angle light guide member according to one embodiment, and FIG. 20B is a diagram illustrating a narrow angle light guide member according to one variational example.

DETAILED DESCRIPTION OF EMBODIMENTS

Certain embodiments of the present invention will be described below with reference to the accompanying drawings. In the description below, the same numerals in different drawings indicate the same or similar portions or members.

The embodiments described below are intended as illustrative of a light emitting device to give a concrete form to technical ideas of the present invention, and the scope of the invention is not limited to those described below. The sizes, materials, shapes and the relative configuration etc. of the components described in embodiments are given as an example and not as a limitation to the scope of the invention unless specifically described otherwise. The sizes and the positional relationships of the members in each of the drawings are occasionally shown exaggerated for ease of explanation.

The X direction along the X-axis, Y-axis, and Z-axis may indicate the direction in the array plane where the light source parts of the light source part for the embodiment are aligned. The Y direction along the Y-axis indicates the direction perpendicular to the X direction in the array plane, and the Z-axis indicates the direction perpendicular to the alignment plane.

The direction in which the arrow is oriented in the X direction is indicated as +X (plus X) direction and the direction opposite to the +X direction is indicated as −X (minus X) direction. The direction in which the arrow is oriented in the Y direction is indicated as +Y (plus Y) direction and the direction opposite to the +Y direction is indicated as −Y (minus Y) direction. The direction in which the arrow is oriented in the Z direction is indicated as +Z (plus Z) direction and the direction opposite to the +Z direction is indicated as −Z (minus Z) direction. In the embodiments, a plurality of light source parts are configured to emit light in +Z direction, for example.

Structure of Light Emitting Device 10

A structure of a light emitting device 10 according to one embodiment will be illustrated below.

Example of Overall Structure

Figure 1A:
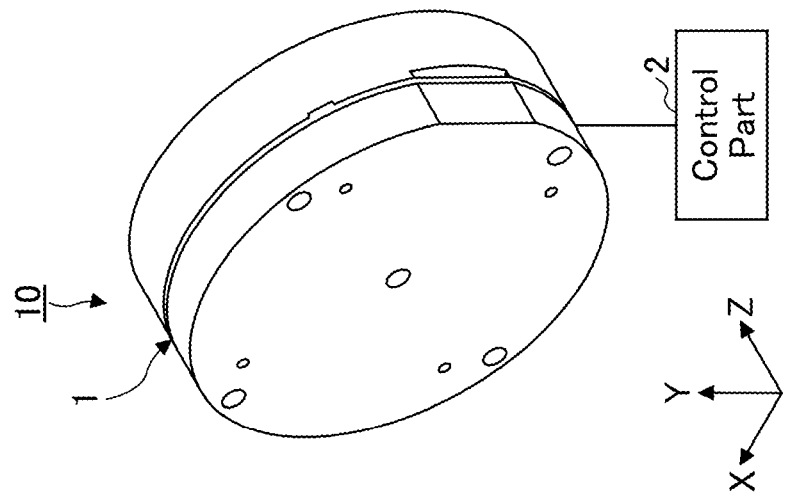
FIGS. 1A and 1B show an example of the overall configuration of a light emitting device according to one embodiment, where
Figure 1B:
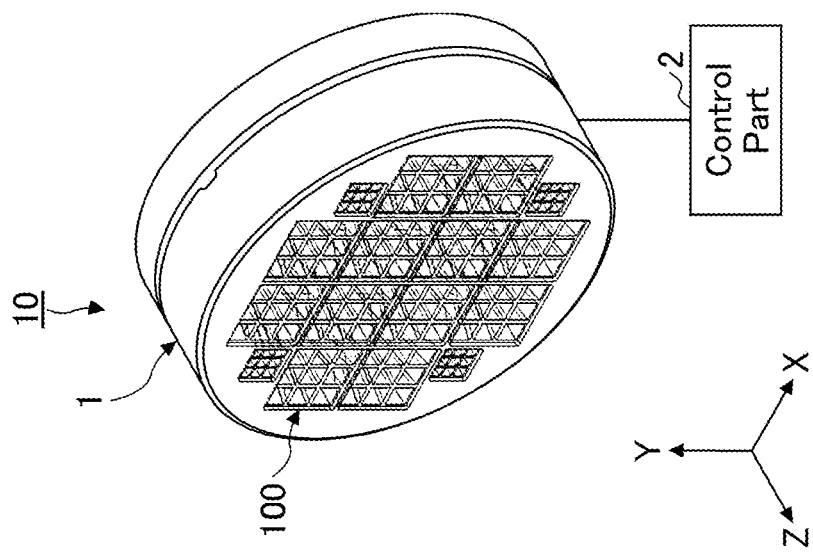

FIGS. 1A and 1B show an example of the overall configuration of a light emitting device 10 according to one embodiment, where FIG. 1A is a perspective view of the light emitting device 10 taken from the light emitting side of the light emitting device 10, and FIG. 1B is a perspective view of the light emitting device 10 taken from the opposite side of the light emitting side of the light emitting device 10.

The light emitting device 10 is a device is configured to provide light distribution for space rendering, in the form of downlighting, spotlights, etc. to the walls, floor surfaces, etc., in a store/facility, or signboards etc., provided at a store/facility. As shown in FIGS. 1A and 1B, the light emitting device 10 includes a light distribution module 1 having a cylindrical shape and a control part 2 to control the distribution of light from the light distribution module 1 having a cylindrical shape.

As described later below, the term "light-irradiation surface" in the present specification refers to a surface that is a subject to be irradiated with light emitted from the light emitting device. The term "light-irradiation region" refers to a region within a light-irradiation surface, in more detail, to a region to be irradiated with an illuminance of at least one-half of an illuminance at center position. The term "illuminance at center position" refers to an illuminance at a "position of center of light-irradiation region" which refers to a position at substantially the center of a light-irradiation region (centroid).

The light distribution module 1 is a module that is installed on the ceiling or wall etc., of a store/facility to provide light distribution. In the present specification, the term "light distribution" refers to a spatial distribution of an illuminance of light emitted from the light emitting device 10. Space rendering using light distribution can be performed by making the light distributed to the walls and floors visible to users of a store/facility, etc.

As shown in FIG. 1A, the light distribution module 1 has a structure in which an opening 100 to allow light to pass through is formed in a surface at the +Z direction side, such that light emitted inside the light distribution module 1 is directed through the opening 100 and then irradiated in the +Z direction. The light distribution module 1 is configured to be mounted on the ceiling or wall of a store/facility, with its back-side surface in the −Z direction or with its cylindrical part as a portion to be secured.

The control part 2 is a device configured to control irradiation of light from a plurality of light source parts. The control part 2 is electrically connected to the light distribution module 1 and outputs control signals so as to control light distribution of the light distribution module 1. The control part 2 outputs control signals in response to operations by the manager of the store/facility or the operator installing the light emitting device 10. Alternatively, the control part can output control signals in conjunction with other light emitting devices and/or external devices such as personal computers (Pcs).

Figure 2:
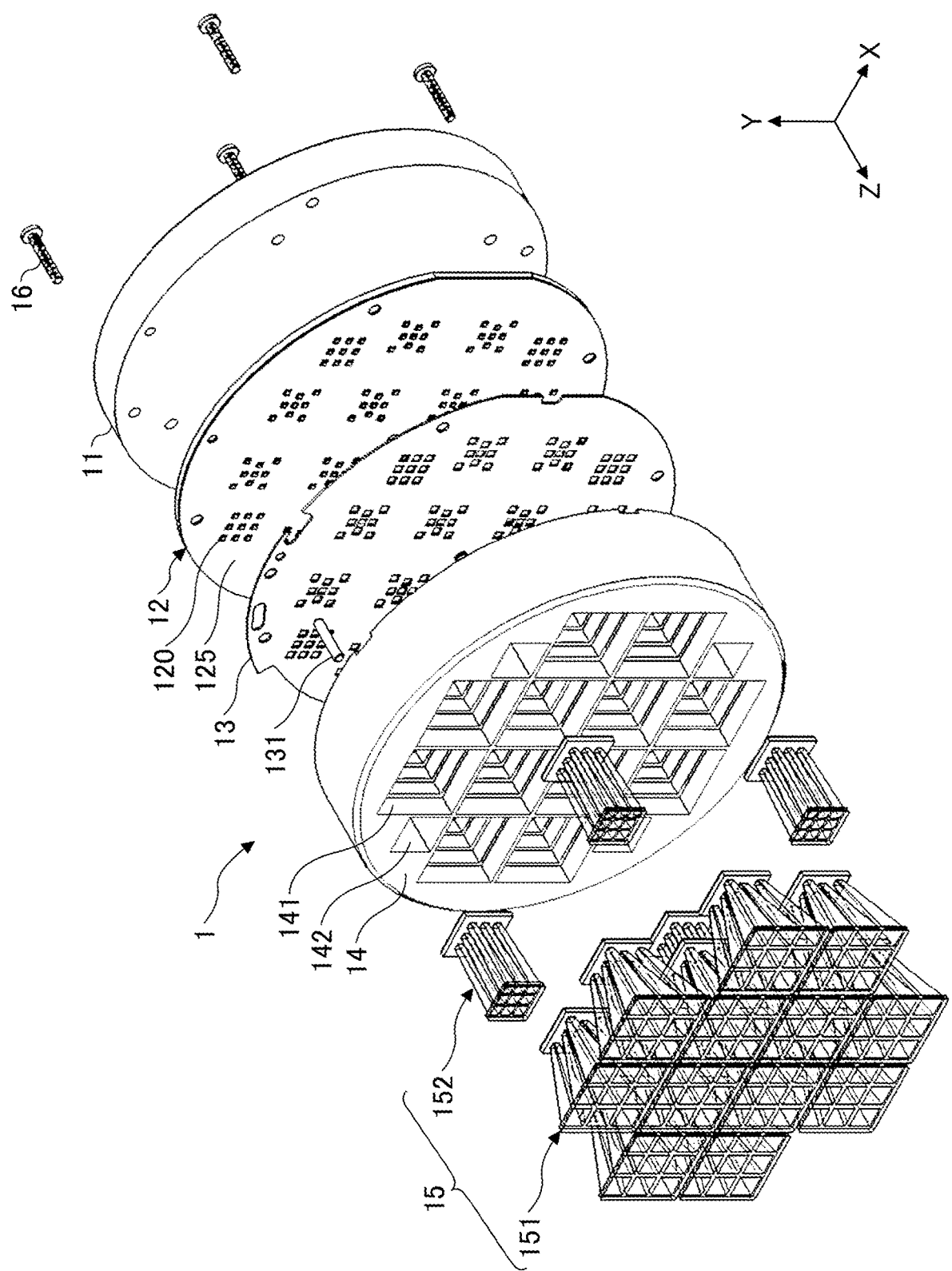
FIG. 2 is a schematic exploded perspective view illustrating the overall configuration of the light emitting module according to one embodiment.

FIG. 2 is an exploded perspective view of a light distribution module 1 of the light emitting device 10. As shown in FIG. 2, the light distribution module 1 includes a back-side member 11, a light emitting diode (LED) substrate 12, a spacer 13, a light guide holding member 14, and an array of light guide members 15, which are assembled along the Z direction and secured with fixing screws 16 to form the light distribution module 1.

The back-side member 11 is a disk-shaped member that forms a back surface part of the light distribution module 1. The material of the back-side member 11 can be appropriately selected, but the back-side member 11 serves as a base of the light distribution module 1, such that the back-side member 11 is preferably made of a material having a high rigidity, and also in order to stably secure the light emitting device 10 on the ceiling or wall, a lightweight material is preferably employed. Further, the back-side member 11 serves to disperse heat generated by the LEDs 120 and transferred through the LED substrate 12. Therefore, the back-side member 11 is preferably made of a material having high thermal conductivity such as a metal. For example, the back-side member 11 is preferably made of an aluminum alloy and using die-casting technology.

The LED substrate 12 is a disc-shaped printed substrate on which a plurality of arrays of a plurality of LEDs 120 are mounted. The surface of the LED substrate 12 in the +Z direction is used for the mounting surface 125, and the plurality of LEDs 120 are mounted on the mounting surface 125. For the LED substrate 12, for example, a metal-base (for example, aluminum or copper) two-layer printed substrate can be used.

The spacer 13 is a disk-shaped member used to maintain spacing in Z direction between the LEDs 120 on the LED substrate 12 and the light guide member array 15 at a predetermined distance. The spacer 13 is secured in a state in which a flat portion of the LED substrate 12 and a flat portion of the spacer 13 are in contact with each other. The spacer 13 is formed with a plurality of through holes at positions in conformity to the plurality of LEDs 120, such that the flat portion of the spacer 13 and the flat portion of the LED substrate 12 are bring in contact with each other, and light emitted from each of the plurality of LEDs 120 is allowed to pass through a corresponding one of the plurality of through-holes.

A region of a surface of the spacer 13 at one side (surface at −Z direction side etc.) where the through holes are not formed is brought in contact with the LED substrate 12, and a region of a surface of the spacer 13 at the other side (surface at +Z direction side etc.) where the through holes are not formed is brought in contact with the light guide holding member 14 such that the LED substrate 12 and the spacer 13, and the spacer 13 and the light guide holding member 14 are held in place, respectively. This arrangement ensures that the spacing in the Z direction between the light guide member array 15 held by the light guide holding member 14 and the LEDs 120 is maintained at a predetermined distance in the through-hole region.

The spacer 13 is also provided with a plurality of positioning pins 131 at plurality of respective positions within the flat portion of the spacer 13. Fitting those positioning pins 131 into the positioning holes formed in the light guide holding member 14 allows aligning of the light guide member array 15 held by the light guide holding member 14 and the LEDs 120 within the XY plane.

The material of the spacer 13 can be appropriately selected, but it is preferable to use a material having a sufficient strength that can prevent or reduce time-depending changes in the spacing distance, and also having high heat-dissipating property to the heat generated by the LED substrate 12. For example, a metal material such as aluminum can be suitably employed.

The light guide holding member 14 is a cylindrical member configured to hold the light guide member array 15. One side of the light guide holding member 14 (surface in the +Z direction, etc.) is formed with a plurality of narrow-angle through-holes 141 and a plurality of wide-angle through holes 142 for engaging and holding the plurality of light guide member arrays 15.

The narrow-angle through-holes 141 are adapted for engagingly receiving and securing the narrow-angle light guide member arrays 151 among the light guide member arrays 15, which will be described below. Twelve narrow-angle through-holes 141 are formed corresponding to the number of the narrow-angle light guide member arrays 151.

The wide-angle through-holes 142 are adapted for engagingly receiving and securing the wide-angle light guide member arrays 152 among the light guide member arrays 15, which will be described below. Four wide-angle through-holes 142 are formed corresponding to the number of the wide-angle light guide member arrays 152.

The light guide holding member 14 holds the light guide member array 15, in which the narrow-angle light guide member arrays 151 are secured in respective narrow-angle through-holes 141 by using an adhesive, and wide-angle light guide holding members 152 are secured in respective wide-angle through-holes 142 by using an adhesive. For such securing, other than by adhesion, an appropriate securing technique such as press-bonding may be employed.

The material of the light guide holding member 14 can be appropriately selected, but a material having high rigidity is preferable to stably hold the light guide member array 15, and a lightweight material is preferable to stably securing the light emitting device 10 to the ceiling or wall. For example, the light guide holding member 14 is preferably made of an aluminum alloy and using die-casting technology.

Light emitted by LEDs 120 corresponding to the narrow-angle light guide member arrays 151 enter the narrow-angle light guide member arrays 151 through the narrow-angle through-holes 141 and exit from the narrow-angle light guide member arrays 151, respectively. Light emitted by LEDs 120 corresponding to the wide-angle light guide member arrays 152 enter the wide-angle light guide member arrays 152 through the wide-angle through-holes 142 and exit from the wide-angle light guide member arrays 152, respectively.

Regions of the light guide holding member 14 other than the regions defining the narrow-angle through-holes 141 and the wide-angle through holes 142 do not allow light emitted from the LEDs 120 to pass through. For this reason, the regions defining the narrow-angle through-holes 141 and the wide-angle through-holes 142 on the surface of the light guide holding member 14 in the +Z direction serve as openings 100 (see FIG. 1A), which allows light to pass through only the predetermined regions.

The light guide member array 15 is an optical member including a plurality of light guide members each configured to direct light emitted by a corresponding one of the plurality of LEDs 120, aligned in a predetermined configuration. The light guide member array 15 is made of a material that is transmissive to the wavelength(s) of light emitted by the LEDs 120. The LEDs 120 are configured to emit light at least in the wavelength range of visible light. Therefore, a material that is transmissive to at least light in the visible wavelength range can be used.

For the light guide member array 15, for example, a glass material or a resin material can be used. When the light guide member array 15 is manufactured using a resin material and an injection molding technique, it is more preferable in view of cost and productivity. For example, silicone resin can be used as the resin material.

Further, it is further preferable when the resin that is used to form the light guide member array 15 contain light-scattering particles having a refractive index that is different from that of the resin, scattering of light guided in the light guide member array 15 can be improved, which can reduce uneven brightness in the irradiation light from the light emitting device 10. Examples of such scattering particles includes acrylic crosslinked particles with a particle size in a range of 4 to 5 μm. However, if there is a difference in refractive index with respect to that of the resin that make up the light guide member array 15, any appropriate material can be employed for the light-scattering particles.

Each of the light guide members included in the light guide member array 15 is formed in a tapered shape gradually narrowing toward the corresponding one of the LEDs 120. In the present specification, the term "tapered shape" refers to a shape of a long and narrow member, in which the diameter, width, or thickness is gradually reduced. Each of the light guide members according to the present embodiment is formed in a tapered shape narrowing toward a corresponding one of the LEDs 120. The direction toward the LED 120 corresponds to the −Z direction in FIG. 2, and each of the light guide members included in the light guide member array 15 is formed in a tapered shape narrowing in the −Z direction in FIG. 2.

In the present embodiment, when each of the light guide members have a shape narrowing toward a corresponding one of the LEDs 120, the shape will be referred to as a tapered shape, even when the inclinations of lateral surfaces of the light guide member are not symmetrical to the central axis of the light guide member. In the present embodiment, each of the light guide members has a rectangular shape in a cross-section intersecting the central axis of the light guide member, but the cross-sectional shape may be other shape such as a circular shape.

The light emitted by each of the LEDs 120 enters the light guide material through the incident surface formed on the narrow side of the tapered shape of the light guide member (in the −Z direction, etc.). Then, the light propagates through the interior of the light guide member while repeating total reflection on the lateral surfaces of the light guide member, and then exits the light guide member through the light-exiting surface formed on the thick side of the taper shape of the light guide member (in the +Z direction, etc.). The emitted light corresponds to irradiation light emitted from the light emitting device 10 in the +Z direction. The light emitted from the plurality of light guide members that constitute the light guide member array 15 is synthesized to form a desired light distribution pattern.

The light guide member array 15 includes the narrow-angle light guide member arrays 151 and the wide-angle light guide member arrays 152. The narrow-angle light guide member array 151 is an optical member including a plurality of narrow-angle light guide members. Each of the light guide members has a taper angle of about 5.7 degrees and a divergence angle of emitted light is about 12.5 degrees. The narrow-angle light guide array 151 includes 12 groups of the narrow-angle light guide members, in which each group includes nine narrow-angle light guide members.

The value of the divergence angle corresponds to a half angle at half-maximum. The above can be applied in a similar manner below.

The wide angle light guide member array 152 is an optical member formed with a plurality of wide-angle light guide members. Each of the wide-angle light guide members has a taper angle of about 1.9 degrees, and divergence angle of light emitted from each of the wide-angle light guide members is about 30 degrees. The wide-angle light guide member array 152 includes four groups of wide-angle light guide members, in which each group includes nine wide-angle light guide members. In the description below, the divergence angle of light emitted from the narrow-angle light guide member array 151 will be referred to as "first divergence angle" and the divergence angle of light emitted from the wide-angle light guide member array 152 will be referred to as "second divergence angle". The divergence angles of about 12.5 degrees and about 30 degrees are, respectively, examples of a first divergence angle of light emitted from the narrow-angle light guide member array 151 and a second divergence angle of light emitted from the wide-angle light guide array 152.

In the present embodiment, the light guide member array 15 that includes light guide member arrays having divergence angles of 12.5 degrees and 30 degrees, respectively, is illustrated, but light guide member arrays of different divergence angles may also employed. That is, the light guide member array 15 may include light guide member arrays of divergence angles other than 12.5 degrees and 30 degrees, or may include light guide member arrays of three or more different divergence angles.

In addition, the term "wide angle" in a wide-angle light guide member array 152 means that the divergence angle of the light emitted is relatively greater compared to that of light emitted from a narrow-angle light guide array 151, and is not limited to the angle commonly referred to as "wide angle". Similarly, the term "narrow angle" in a narrow-angle light guide member array 151 means that the divergence angle of the light emitted is relatively less compared to that of light emitted from a wide-angle light guide array 152, and is not limited to the angle commonly referred to as "narrow angle".

In other words, the divergence angle of the light emitted from the narrow-angle light guide member array 151 is less than the divergence angle of the light emitted from the wide-angle light guide member array 152.

Further, the taper angle of individual light guide members and the number of the light guide members, and number of groups of light guide members in the narrow-angle light guide member array 151 and the wide-angle light guide array 152 can be appropriately determined according to purpose. The present embodiment also illustrates an example of light propagating through the light guide member by total internal reflection at lateral surfaces of the light guide member, but propagation of light in different manner may also be employed. For example, deflection surfaces such as reflective surfaces can be provided on each of the lateral surfaces of the light guide member, such that light can be deflected at the lateral surfaces of the light guide member and allowed to propagate through the light guide member.

Structure of Light Source Parts 30

Figure 3C:
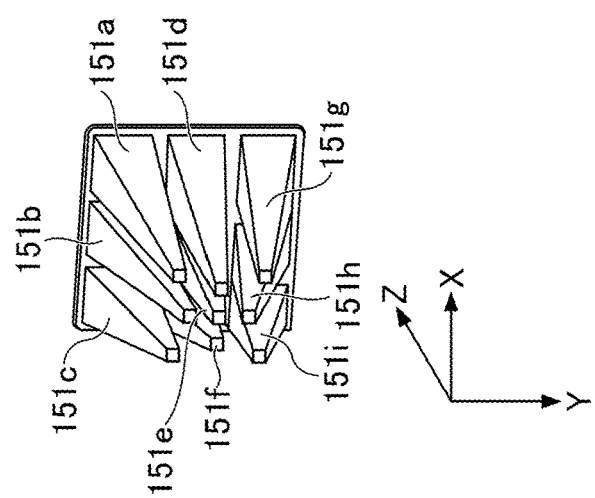
FIGS. 3A to 3C are each schematic diagram showing an example of configuration of a narrow-angle light source part, where
Figure 3A:
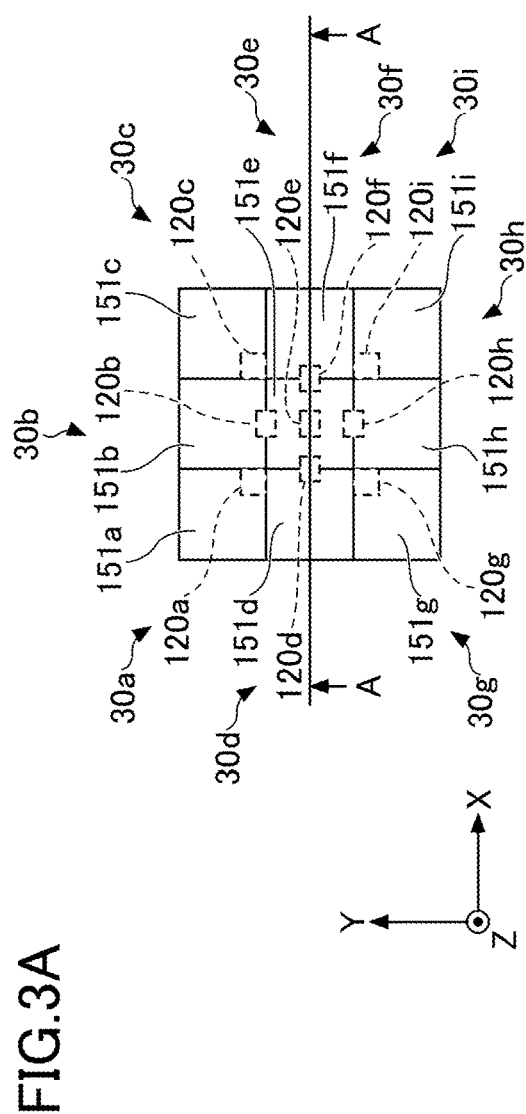
Figure 3B:
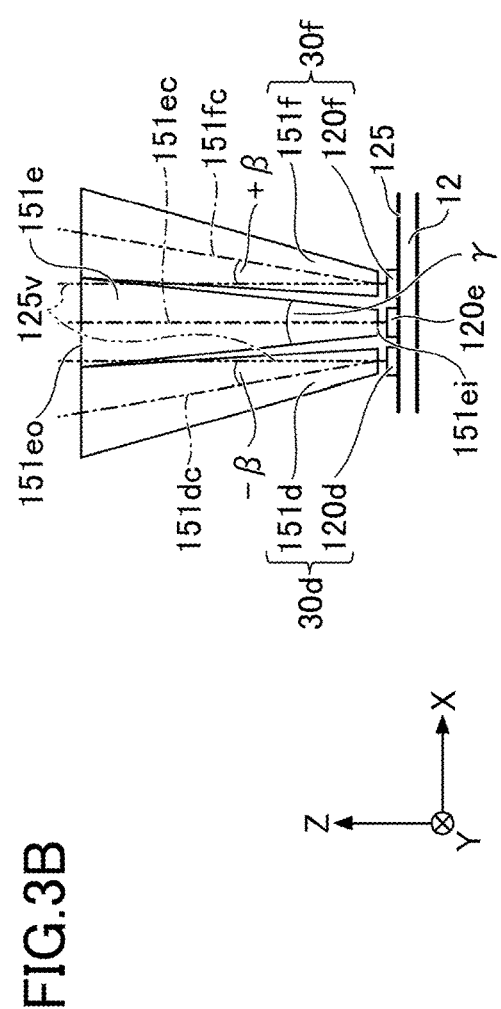

Next, the structure of the light source part 30 of the light emitting device 10 will be described with reference to the FIG. 3A to FIG. 5. For example, the light source part 30 (an example of light source part formed with a plurality of light source parts) includes the narrow-angle light source parts 30a to 30i and wide-angle light source parts 30j. Example of Structure of Narrow-angle Light Source Parts 30a to 30i FIGS. 3A to 3C are each schematic diagram showing an example of configuration of a narrow-angle light source part, where FIG. 3A is a plan view of the narrow-angle light source parts 30a to 30i viewed from +Z direction, FIG. 3B is a cross-sectional view seen from the arrow direction of the A-A line of FIG. 3A, and FIG. 3C is a perspective view of the narrow-angle light guide members 151a to 151i. The narrow-angle light source parts 30a to 30i are an example of a group of narrow-angle light source parts, which includes nine narrow-angle light source parts.

As shown in FIG. 3A, the narrow-angle light source part 30a includes a narrow-angle light guide member 151a and an LED 120a, the narrow-angle light source part 30b includes a narrow-angle light guide member 151b and an LED 120b, and the narrow-angle light source part 30c includes a narrow-angle light guide member 151c and an LED 120c.

Similarly, the narrow-angle light source part 30d includes a narrow-angle light guide member 151d and an LED 120d, the narrow-angle light source part 30e includes a narrow-angle light guide member 151e and an LED 120e, and the narrow-angle light source part 30f includes a narrow-angle light guide member 151f and an LED 120f.

The narrow-angle light source part 30g includes a narrow-angle light guide member 151g and an LED 120g, the narrow-angle light source part 30h includes a narrow-angle light guide member 151h and an LED 120h, and the narrow-angle light source part 30i includes a narrow-angle light guide member 151i and an LED 120i.

In the description below, the narrow-angle light source part 30e will be illustrated as an example of the "first light source part" and the narrow-light source part 30b or the narrow light source part 30f will be illustrated as an example of the "second light source part". However, any of the narrow-angle light source parts 30a to 30i can be the "first light source part". Also, any of the narrow-angle light source parts 30a to 30i except the "first light source part" can be the "second light source part".

If the narrow-angle light source part 30e is the "first light source part", the narrow-angle light guide member 151e corresponds to the "first light guide member" and the LED 120e corresponds to the "first light emitting element". If the narrow-angle light source part 30b is the "second light source part", the narrow-angle light guide member 151b corresponds to the "second light guide member" and the LED 120b corresponds to the "second light emitting element". If the narrow-angle light source part 30f is the "second light source part", the narrow-angle light guide member 151f corresponds to the "second light guide member" and the LED 120f corresponds to the "second light emitting element".

FIG. 3A shows the narrow-angle light source parts 30a to 30i viewed from the light-exiting surface side of the narrow-angle light guide members 151a to 151i. Each of the light-exiting surfaces of the narrow-angle light guide members 151a to 151i are formed in a rectangular shape. The narrow-angle light source parts 30a to 30i are arranged in a two-dimensional array on the +Z side of the LED substrate 12, with three in the X direction and three in the Y direction.

FIG. 3A shows LEDs 120a to 120i arranged in the −Z direction of the narrow-angle guide members 151a to 151i, with the narrow-angle light guide members 151a to 151i in see-through representation. Also in FIG. 3A, the LED substrate 12 is not shown.

FIG. 3B shows a cross-sectional view of the narrow-angle light source parts 30d, 30e, and 30f, taken along A-A in FIG. 3A. As shown in FIG. 3B, the LEDs 120d, 120e, and 120f are disposed on the mounting surface 125 of the LED substrate 12. The narrow-angle light guide member 151d is disposed facing the LED 120d from the +Z direction side, the narrow-angle light guide member 151e is disposed facing the LED 120e from the +Z direction side, and the narrow-angle light guide member 151f is disposed facing the LED 120f from the +Z direction side.

The narrow-angle light guide members 151d, 151e, and 151f are formed in tapered shapes narrowing (decreasing in cross sectional areas perpendicular to respective center axes) toward the LEDs 120d, 120e, and 120f, respectively. The taper angles of the tapered shapes of the narrow-axis light guide members 151d, 151e, and 151f are γ, and as described above, the taper angle γ in the present embodiment is about 5.7 degrees.

The incident surface 151ei of the narrow-angle light guide member 151e is approximately the same size as the LED 120e and is disposed facing the LED 120e. The light-exiting surface 151eo of the narrow-angle light guide member 151e is greater (greater areas) than the incident surface 151ei.

Similarly, the incident surface of the narrow-angle light guide member 151d is approximately the same size as the LED 120d and is disposed facing the LED 120d. The incident surface of the narrow-angle light guide member 151f is approximately the same size as the LED 120f and is disposed facing the LED 120f. The light-exiting surface of the narrow-angle light guide member 151e is greater than the incident surface, and the light-exiting surface of the narrow-angle light guide member 151f is greater than the incident surface.

The narrow-angle light guide members 151d, 151e, and 151f are shaped in a way that the central axes of each other are tilted to each other. In more detail, the narrow-angle light guide member 151e is formed with the central axis 151ec is approximately in parallel to a normal line 125v to the mounting surface 125. Meanwhile, the narrow-angle light guide member 151d is formed with the central axis 151dc tilted by an angle −β with respect to the normal line 125v to the mounting surface 125. The narrow-angle light guide member 151f is formed with the central axis 151fc tilted by an angle +β with respect to the normal line 125v to the mounting surface 125.

Thus, the narrow-angle light guide members 151d, 151e, and 151f are disposed such that their central axes are inclined to one another. Due to the inclination of the central axes, the distance between the central axis 151ec and the central axis 151fc is greater at the light emitting side than at the light incident side. As shown in FIG. 3C, when seen as one whole, the narrow-angle light guide members 151a to 151i have a truncated pyramid shape.

The narrow-angle light guide members 151a to 151i may be structured such that the lateral surfaces of adjacent narrow-angle light guide members contact each other, or they may not touch each other. However, when the lateral surfaces of adjacent narrow-angle light guide members are in contact with each other, total reflection will not occur, such that a reflection layer is preferably formed on each of the lateral surfaces.

In the example shown in FIGS. 3A to 3C, the narrow-angle light guide members 151a to 151i do not have reflective layers on the lateral surfaces, and the light propagates within the narrow-angle light guide members 151a to 151i while totally reflected. At the light-exiting surface side of the narrow-angle light guide members 151a to 151i, the lateral surfaces of the adjacent narrow-angle light guide members are close to each other but are not in contact with each other. Meanwhile, at the light incident surface side, spacing between the lateral surfaces of the adjacent narrow-angle light guide members are increased compared to that at the light incident surface side.

Figure 4C:
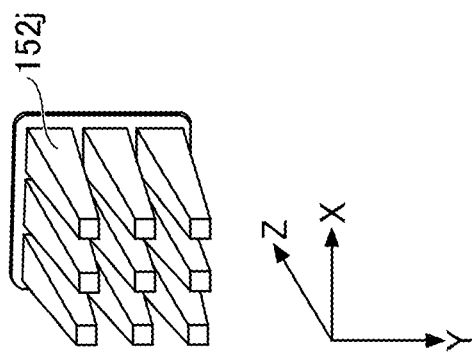
FIGS. 4A to 4C are each schematic diagram showing an example of configuration of a wide-angle light source part, where

It is preferable that when the lateral surfaces of the adjacent narrow-angle light guide members are configured not to in contact with each other at the light incident surface side, spacing between adjacent LEDs can be increased, and effect of heat between the adjacent LEDs can be reduced.
Example of Configuration of Wide-Angle Light Source Part 30j FIGS. 4A to 4D are each schematic diagram showing an example of configuration of a wide-angle light source part 30j, where FIG. 4A is a plan view of the wide-angle light source part 30j viewed from the +Z direction side, FIG. 4B is a cross-sectional view seen from the arrow direction of the B-B line of FIG. 4A, and FIG. 4C is a perspective view of a wide-angle light guide member 152j.

The wide-angle light source part 30j is an example of a group of wide-angle light source parts, in which a single group includes nine wide-angle light source parts. Because all the nine wide-angle light source parts have a same structure in this implementation, each of the wide-angle light source parts will be referred to as "wide-angle light source part 30j" in the description below.

Figure 4A:
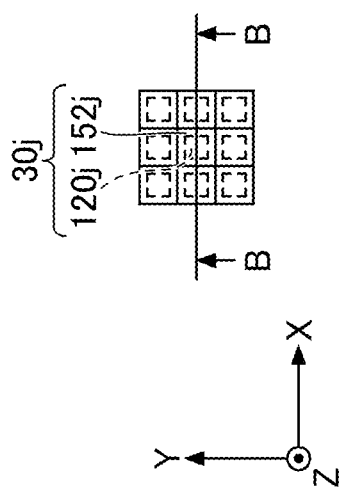
Figure 4B:
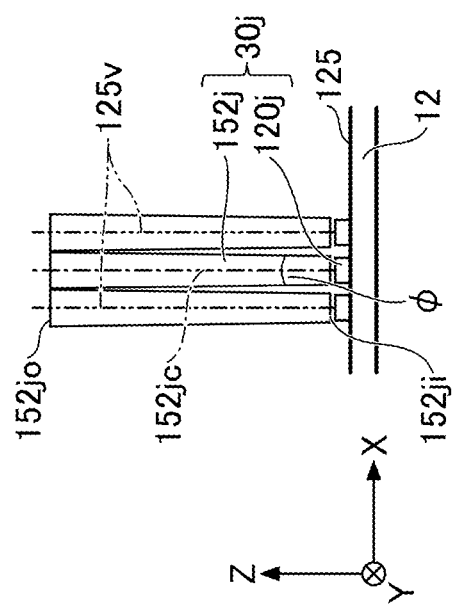

As shown in FIG. 4A, the wide-angle light source part 30j includes a wide-angle light guide member 152j and an LED 120j. FIG. 4A shows the wide-angle light source part 30j viewed from the light-exiting surface side of the wide-angle light guide member 152j. The wide-angle light source part 30j corresponds to a third light source part, the LED 120j corresponds to a third light emitting element, and the wide-angle light guide member 152j corresponds to a third light guide component.

The light-exiting surface of each of the wide-angle light guide members 152j is formed in a rectangular shape. The wide-angle light source parts 30j are arranged in a two-dimensional array shape on the +Z direction side of the LED substrate 12, with three aligned along the X direction and three aligned along the Y direction.

In FIG. 4A, the LED 120j, which is disposed in the −Z direction of the wide-angle light guide member 152j, is shown with the wide-angle light guide member 152j in see-through configuration. Also in FIG. 4A, the LED substrate 12 is not shown.

FIG. 4B is a cross-sectional view of the wide-angle light source part 30j seen from the arrow direction of the B-B line of FIG. 4A. As shown in FIG. 4B, the LED 120j is disposed on the mounting surface 125 of the LED substrate 12. The wide-angle light guide member 152j is mounted facing the LED 120j from the +Z direction side.

The wide-angle light guide member 152j is formed in a tapered shape narrowing toward the LED 120j. The taper angle of the taper shape of the wide-angle light guide member 152j is φ, and as described above, the taper angle φ is about 1.9 degrees. Therefore, the taper angle φ of the wide-angle light guide member 152j is different from the taper angle γ of the narrow-angle light guide members 151d, 151e, and 151f described above.

The light incident surface 152ji of the wide-angle light guide member 152j is formed approximately the same size as that of the LED 120j and is disposed facing the LED 120j. The light-exiting surface 152jo of the wide-angle light guide member 152j is larger than the light-incident surface 152ji. The nine wide-angle light guides 152j are all formed such that the central axis 152jc is substantially in parallel to the normal line 125v to the mounting surface 125. Example of Configuration of Narrow-angle Light Source Parts 30a to 30i and Wide-angle Light Source Parts 30j.

Figure 5:
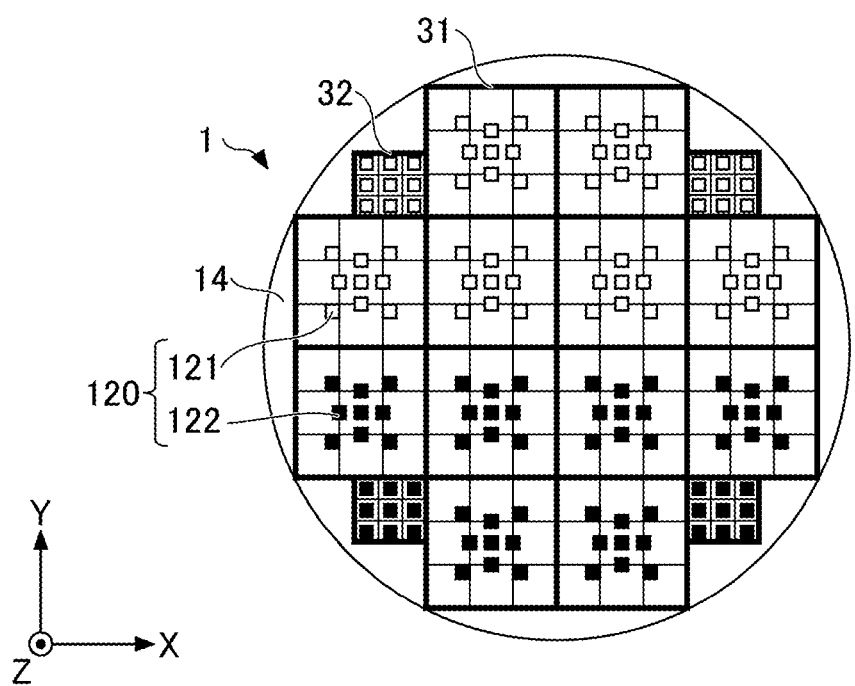
FIG. 5 is a schematic plan view illustrating an example of arrangement of narrow-angle light source parts and wide-angle light source parts according to one embodiment.

FIG. 5 is a schematic plan view illustrating an example of arrangement of narrow-angle light source parts 30a to 30i and wide-angle light source parts 30j in the light emitting device 10.

FIG. 5 shows the light emitting device 10 viewed from the +Z direction side. Twelve groups of the narrow-angle light source parts, each group 31 including nine narrow-angle light source parts 30a to 30i, are arranged in the XY plane. Also, four groups of wide-angle light source parts, each group 32 including nine wide-angle light source parts 30j, are arranged in the XY plane. The XY plane is a plane parallel to the mounting surface 125 of the LED substrate 12 (see FIG. 2).

Among the quadrangular regions shown in FIG. 5, the regions demarcated by thin solid lines represent individual narrow-angle light source parts 30a to 30i or individual wide-angle light source parts 30j, while the regions demarcated by thick solid lines represent the groups 31 of the narrow-angle light source parts or the groups 32 of the wide-angle light source parts.

The LEDs 120 include white LEDs 121 each configured to emit white light, and "light bulb color" LEDs 122 each configures to emit light of incandescent-lamp color. In FIG. 5, the white LEDs 121 are shown as blank squares and the light bulb color LEDs 122 are shown as black squares.
Example of Function Configuration of Control Part 2

Figure 6:
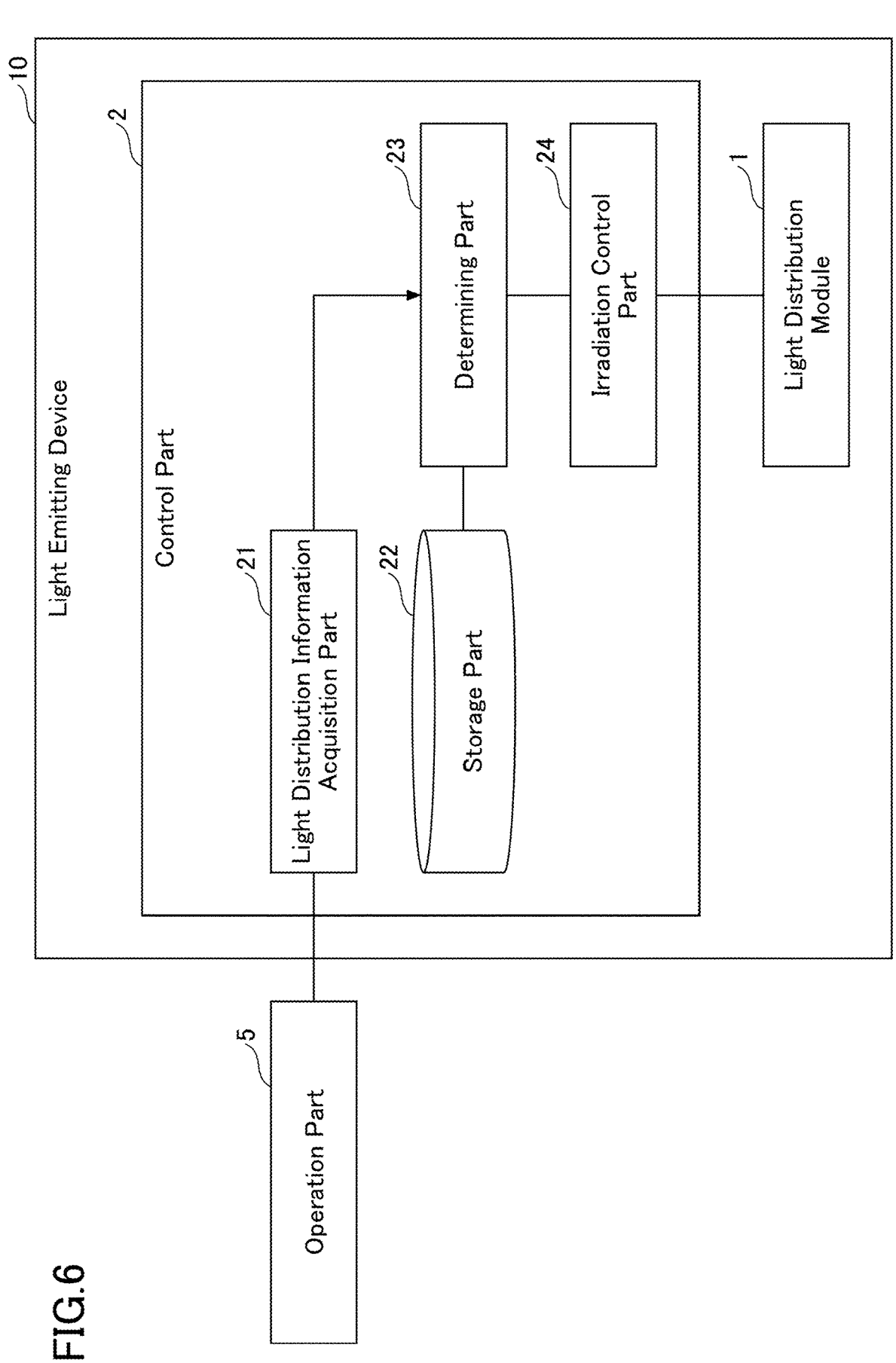
FIG. 6 is a block diagram illustrating an example of functional configuration of a control part according to one embodiment.

Next, function configuration of the control part 2 of the light emitting device 10 will be described. FIG. 6 is a block diagram illustrating an example of function configuration of the control part 2. As shown in FIG. 6, the control part 2 includes a light distribution information acquisition part 21, a storage part 22, a determining part 23, and an irradiation control part 24.

Among those parts, functions of the light distribution information acquisition part 21, the determining part 23, and the irradiation control part 24 can be realized through electric circuits, and also, parts of some of those functions can be realized by using a software running on central processing unit (CPU). Those functions may also be implemented by multiple circuits or multiple software. The function of the storage part 22 is achieved by a storage device such as read only memory (ROM). Hard disk drives (HDDs) and solid state drives (SSDs) can also be used as storage devices.

The light distribution information acquisition part 21 obtains control information for controlling the light distribution exerted from the light emitting device 10 from the operation part 5. The operation part 5 is a control panel or remote controller located on the wall of a store/facility and operated by the manager or user of the store/facility. The control information indicates the type of light distribution pattern and the intensity of the light being distributed.

The storage part 22 contains a corresponding table that shows the relationship between the type of light distribution pattern and the duty ratio of each of the different light source parts 30 in the light emitting device 10. The term "duty ratio of luminescence" refers to a ratio of the on and off period of light emitting. The higher the duty ratio, the longer the duration of the light emitting, the greater the intensity of the irradiation light.

The determining part 23 is configured to determine the duty ratio of light emission for each of the light source parts based on the type of light distribution pattern. More specifically, the determining part 23 can determine the duty ratio of the light emission of LEDs 120a to 120j housed in the light distribution module 1 by referring to the corresponding table stored in the storage part 22, based on the information indicating the type of light distribution pattern obtained through the light distribution information acquisition part 21.

The irradiation control part 24 can control the irradiation of the light from the narrow-angle light source parts 30a to 30i and the wide-angle light source parts 30j by controlling the light emitting of LED 120a-120j housed in the light distribution module 1, according to the duty ratio determined by the determining part 23.

The light emitting device 10 is configured to allow various light patterns to be formed by controlling the duty ratio of the narrow-angle light source parts 30a to 30i and the wide-angle light source part 30j respectively.

Performance of Light Emitting Device 10

Light Guide Member

Figure 7:
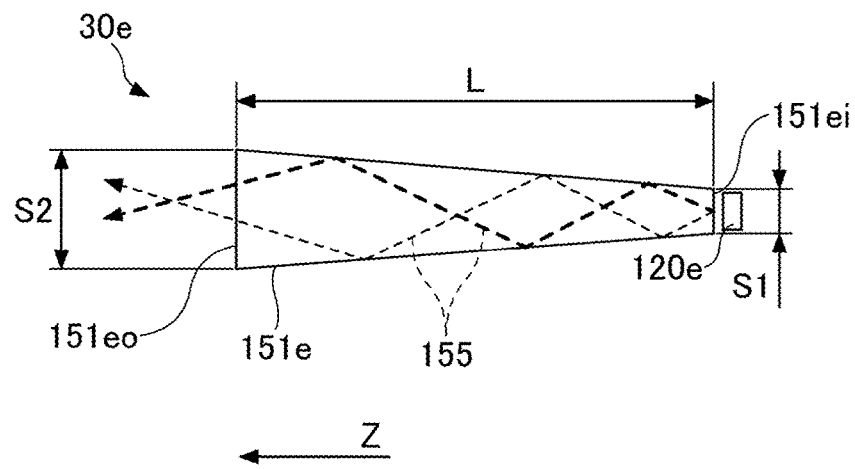
FIG. 7 is a diagram illustrating propagation of light in a light-guide member according to one embodiment.

FIG. 7 is a diagram illustrating propagation of light in a light-guide member according to one embodiment. FIG. 7 illustrates the light emitted by the LED 120e propagating through the narrow-angle light guide member 151e in the narrow-angle light source part 30e.

In FIG. 7, a length of one side in the rectangular shape of the light-incident surface 151ei of the narrow-angle light guide member 151e is S1, and a length of one side in the rectangular shape of the light emitting surface 151eo is S2. The distance between the light-incident surface 151ei and the light emitting surface 151eo in the Z direction is indicated as a propagation distance L. In FIG. 7, broken lines 155 show the light transmitted in the narrow-angle light guide member 151e while repeating total reflection on the lateral surfaces of the narrow-angle light guide member 151e.

Figure 8:
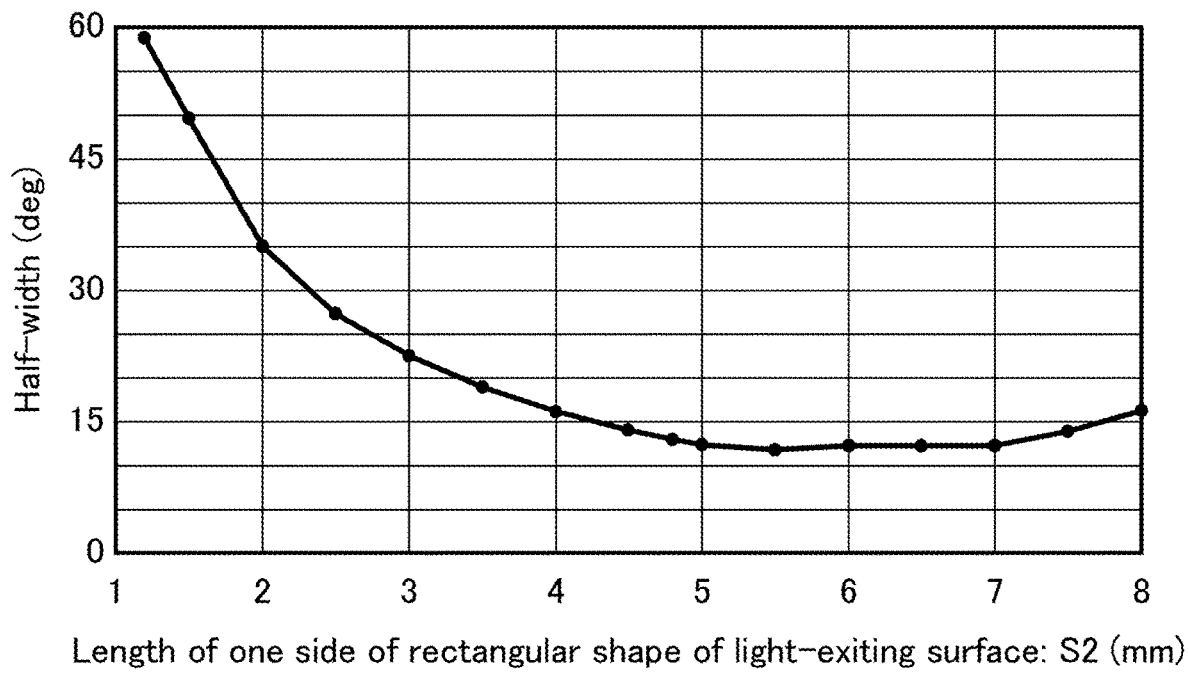
FIG. 8 is a diagram illustrating a relationship between the length of one side of rectangular-shaped light-exiting surface of the light guide member and the divergence angle of the emitting light.

A graph shown in FIG. 8 is obtained when the length of one side S1 is 1.2 mm and the propagation distance L is 18 mm, the divergence angle of light emitted from the narrow-angle light guide member 151e corresponding to change of light emitting surface is calculated.

FIG. 8 is a diagram illustrating an example of relationship between length S2 of the light emitting surface 151eo and divergence angle of emitted light. The horizontal axis indicates a length S2 of one side of the light emitting surface and the vertical axis indicates a half angle at half maximum of a divergence angle of emitted light.

As shown in FIG. 8, the shorter the length S2 of one side of the light emitting surface, the larger the half angle at half maximum (divergence angle) of the emitted light. When the length S2 of one side of the light emitting surface is 4.8 mm, the half angle at half maximum of emitted light is about 12.5 degrees and the taper angle γ of the narrow-angle light guide member 151e is about 5.7 degrees. The half angle at half-maximum and the taper angle γ are common for the narrow-angle light guide members 151a-151i.

The wide-angle light guide member 152j has 1.2 mm of length S1 of one side of the light incident surface, 18 mm of propagation distance L, and 2.4 mm of length S2 of one side of the light emitting surface. In this case, the half angle at half-maximum of the emitted light is about 30 degrees, and the taper angle φ of the wide-angle light guide member 152j is about 1.9 degrees.

Figure 9A:
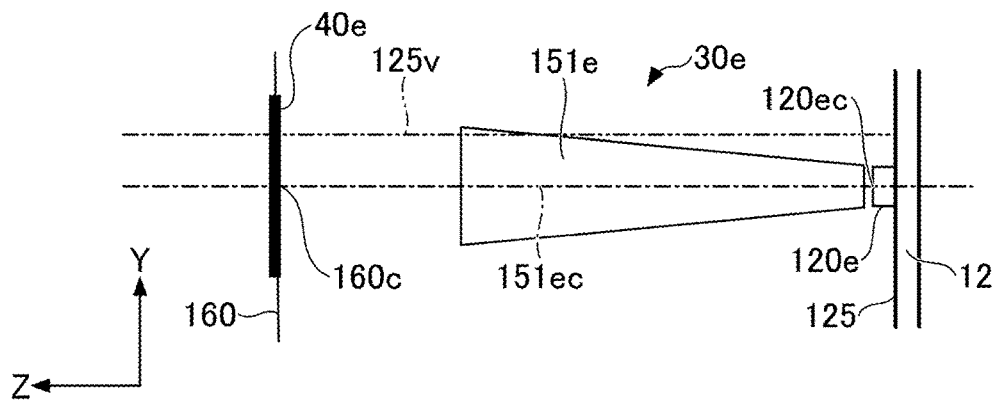
FIGS. 9A and 9B are diagrams each illustrating an example of light irradiation from a narrow-angle light source part, where
Figure 9B:
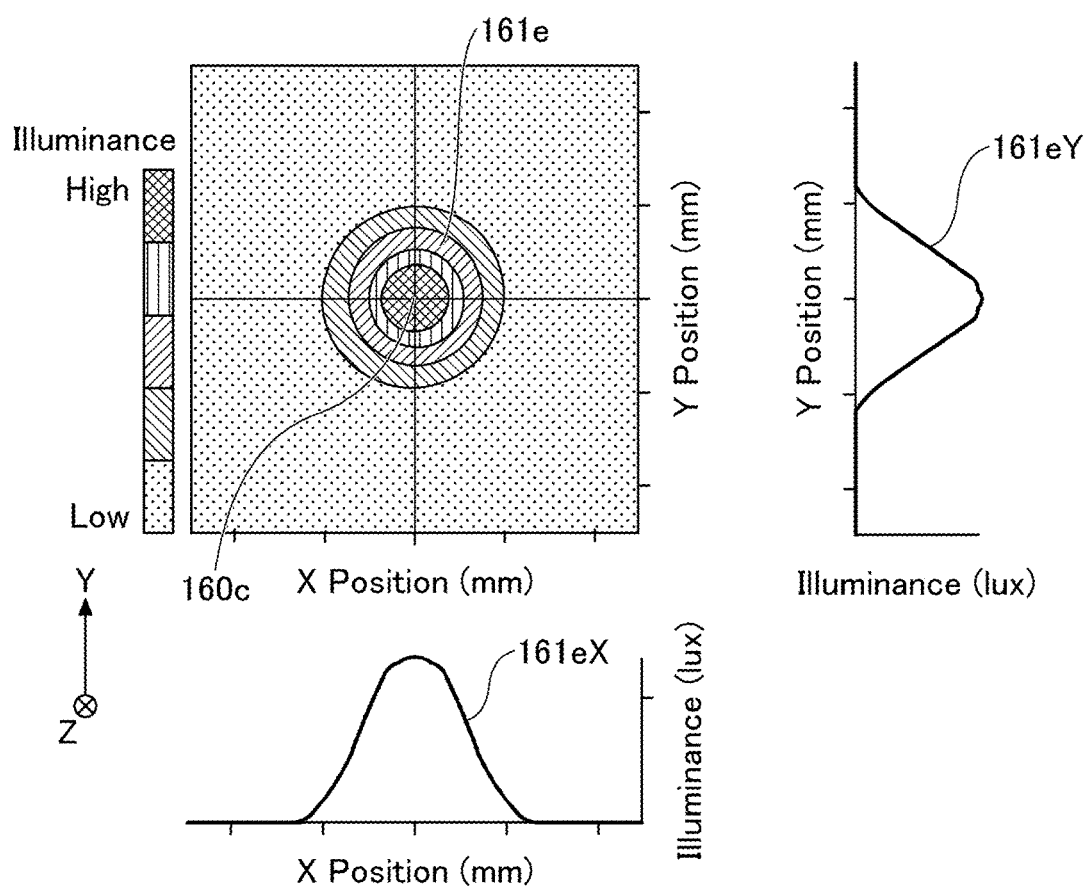

FIGS. 9A and 9B are diagrams each illustrating an example of light irradiation from a narrow-angle light source part 30e, where FIG. 9A illustrates a relationship between light irradiation and light-irradiation region, and FIG. 9B shows a simulated illuminance distribution on the light-irradiation surface.

In the present specification, the term "light-irradiation surface" refers to a surface such as a wall surface or floor surface to which light emitted from the light emitting device 10 is irradiated. The term "light-irradiation region" refers to a region within a light-irradiation surface, in more detail, to a region irradiated with a luminance of at least one-half of an illuminance at center position. The term "illuminance at center position" refers to an illuminance at "position of center of light-irradiation region" which refers to a position at substantially the center of a light-irradiation region (centroid).

As shown in FIG. 9A, the narrow-angle light guide member 151e of the narrow-angle light source part 30e is formed in a shape where the central axis 151ec is in parallel to the normal line 125v to the mounting surface 125 of the LED substrate 12.

The light emitted by the LED 120e propagates along the central axis 151ec. The position of center of light-irradiation region at the light-irradiation surface 160 substantially matches the illuminance at center position 160c, where the normal line to the LED 120e extended from the central position 120ec of the LED 120e intersects the light-irradiation surface 160. The size of the light-irradiation region 40e corresponds to 12.5 degrees that is half angle at half-maximum of the narrow-angle light guide member 151e. The center position 120ec of the LED 120e corresponds to the center of the light-emitting surface of the LED 120e. The center position 120ec corresponds to the center position of the first light source part and the central axis 151ec corresponds to the "first central axis".

At the light-irradiation region 40e, the light emitted from the narrow-angle light guide member 151e gives the illuminance distribution shown in FIG. 9B. In the illuminance distribution 161eX in FIG. 9B, the magnitude of the illuminance [lux] at the light-irradiation surface 160 is shown with shades and counter lines. The X cross-section illuminance distribution 161e represents the illuminous distribution of cross-sectional intensity along the X-axis at the illuminous distribution 161e, and the Y cross-section illuminance distribution 161eY represents the illuminous distribution of cross-sectional intensity along the Y-axis at the intensity distribution 161e. As shown in FIG. 9B, the peak position 161ec of the illuminance distribution 161e substantially coincides with the center 160c of the irradiated region.

Figure 10A:
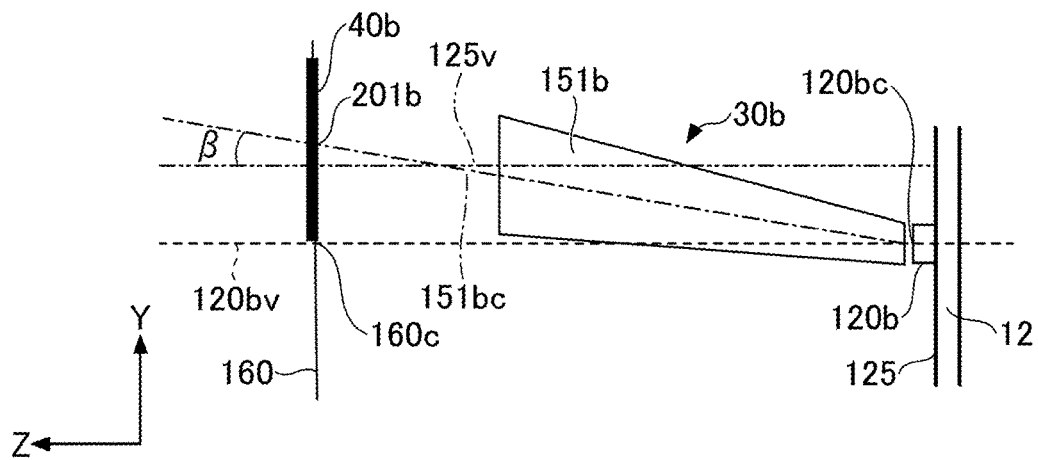
FIGS. 10A and 10B are diagrams each illustrating another example of light irradiation from a narrow-angle light source part, where
Figure 10B:
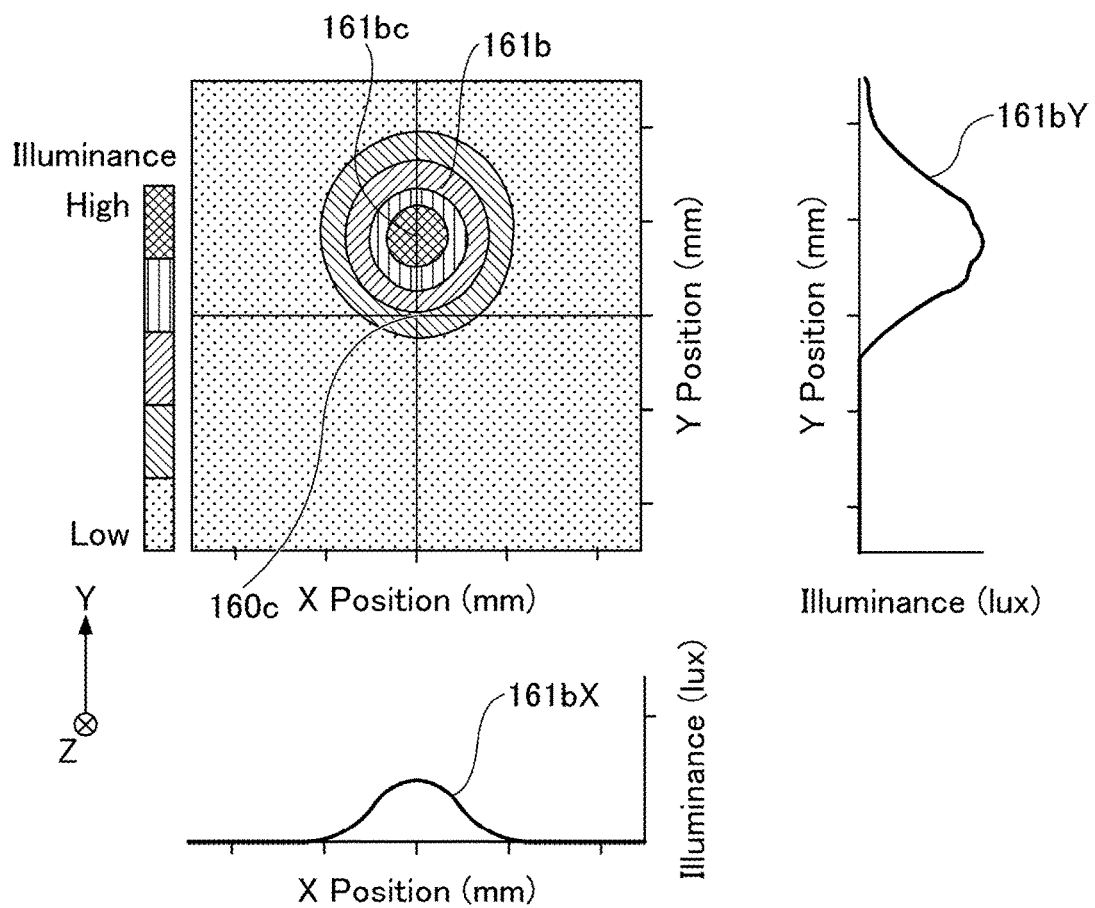

Meanwhile, FIGS. 10A and 10B shows an example of light exposure with the narrow-angle light source part 30b, where (a) shows the relationship with the light-irradiation region, and (b) shows the simulated illuminance on the light-irradiation surface.

As shown in FIG. 10A, the pinching light guide component 151b at the pinching angle 30b is shaped so that the central axis 151bc is angled β in relation to the normal line 125v to the mounting surface 125 of LED substrate 12.

The light emitted by LED 120b propagates along the central axis 151bc. The position of center of light-irradiation region 201b at the light-irradiation surface 160 shifts in the Y direction with respect to the irradiation center position 160c which is a point of intersection between the normal line 120bv passing through the center position 120bc of the LED 120b and the light-irradiation surface 160. The amount of shift corresponds to the angle β of inclination of the central axis 151bc. The size of the light-irradiation region 40b corresponds to the half angle at half maximum of the narrow-angle light guide member 151b of 12.5 degrees. The center position 120*bc* of the LED 120*b* corresponds to the center of the light emitting surface of the LED 120*b*. The center position 120*bc* corresponds to the "center position of the second light source part" and the central axis 151*bc* corresponds to the "second central axis". The position of center of light-irradiation region 201*b* corresponds to the position of center of light-irradiation region of the irradiation light from the second light source part at the light-irradiation surface.

In the light-irradiation region 40*b*, the light emitted from the narrow-angle light guide member 151*b* gives the illuminance distribution shown in FIG. 10B. The illuminance distribution 161*b* shown in FIG. 10B shows contour lines represent the magnitude of the illuminance [lux] at the light-irradiation surface 160 in shades. The X cross-section illuminance distribution 161*b*X represents the illuminance distribution of cross-sectional intensity along the X-axis at the illuminance distribution 161*b*, and the Y cross-section illuminance distribution 161*b*Y represents the illuminance distribution of cross-sectional intensity along the Y-axis at the intensity distribution 161*b*.

As shown in FIG. 10B, the peak position of the illuminance at the illuminance distribution 161*b* is shifted in the Y direction in relation to the position of center of light-irradiation region 160*c*, where the normal line with respect to the LED 120*b* intersects the light-irradiation surface 160.

As illustrated above, by tilting the central axis 151*bc* of the narrow-angle light guide member 151*b* to the normal line 125*v* with respect to the mounting surface 125, the position of the light-irradiation region 40*b* and the peak position of the illuminance can be shifted respectively.

The normal line 125*v* to the mounting surface 125 and the normal line 120*bv* to the light emitting surface of the LED 120*b* are in parallel to each other. Therefore, tilting the central axis 151*bc* of the narrow-angle guide member 151*b* against the normal line 125*v* can be equivalent to tilting the central axis 151*bc* of the narrow-angle guide member 151*b* with respect to the normal line 120*bv* to the light emitting surface of the LED 120*b*.

Also, because the central axis 151*ec* of the narrow-angle light guide member 151*e* (see FIG. 9A) is in parallel to the normal line 125*v*, the central axis 151*ec* of the narrow-angle light guide member 151*e* is configured inclined with respect to the central axis 151*bc* of the narrow-angle light guide member 151*b*.

Example of Irradiation Region with Light Emitting Device 10

Figure 11:
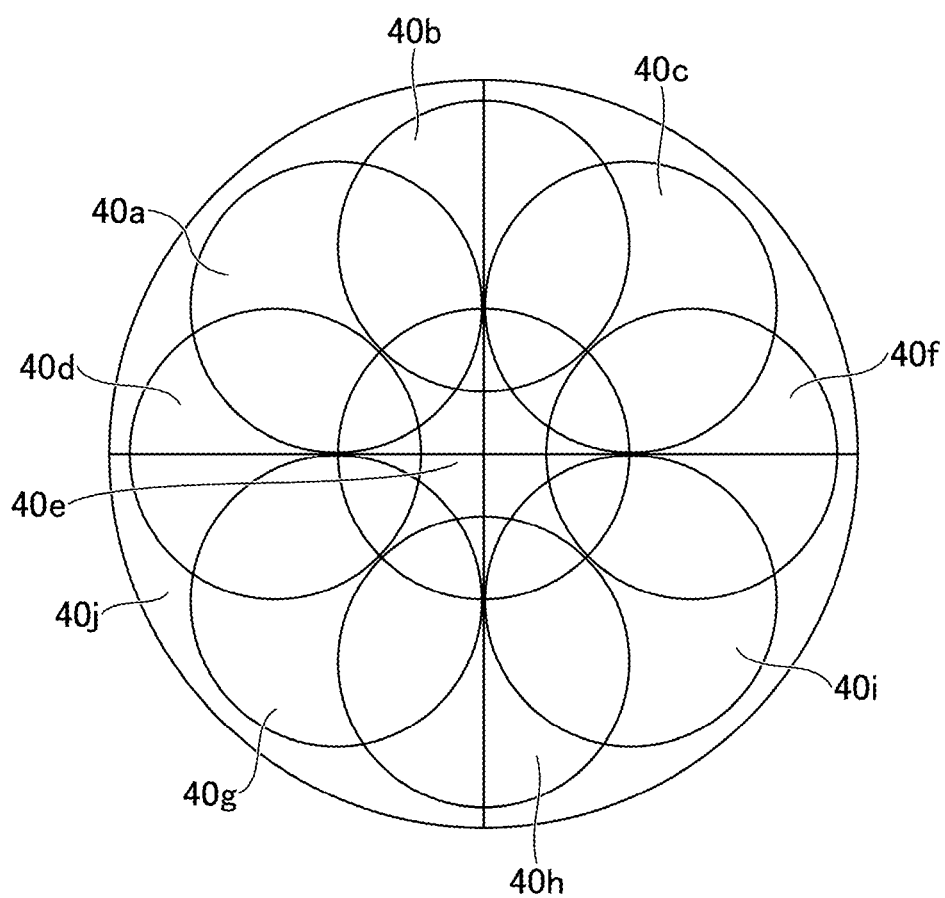
FIG. 11 is a diagram illustrating an example of light-irradiation regions of a light emitting device according to one embodiment.

Next, a light-irradiation region irradiated by the light emitting device 10 will be illustrated. FIG. 11 is a diagram illustrating one example of light-irradiation region.

FIG. 11 illustrates ten light-irradiation regions 40*a*-40*j*. The group 31 of narrow-angle light source parts includes nine narrow-angle light source parts 30*a* to 30*i*. Of those, the narrow-angle light source part 30*a* irradiates light to the light-irradiation region 40*a*, the narrow light source part 30*b* irradiates light to the light-irradiation region 40*b*, and the narrow-angle light source part 30*c* irradiates light to the light-irradiation region 40*c*. Similarly, the narrow-angle light source part 30*d* irradiates light to the light-irradiation region 40*d*, the narrow light source part 30*e* irradiates light to the light-irradiation region 40*e*, and the narrow-angle light source part 30*f* irradiates light to the light-irradiation region 40*f* The narrow-angle light source part 30*g* irradiates light to the light-irradiation region 40*g*, the narrow light source part 30*h* irradiates light to the light-irradiation region 40*h*, and the narrow-angle light source part 30*i* irradiates light to the light-irradiation region 40*i*.

The positions of the light-irradiation regions 40*a* to 40*i* irradiated by the narrow-angle light source parts 30*a* to 30*i* are determined by the angle β of the central axes 151*ac* to 151*ic* of the narrow-angle guide members 151*a* to 151*i*, respectively. For this reason, twelve of the group 31 of narrow-angle light source parts (see FIG. 5) are provided, in which, in any groups, light from any narrow-angle light source parts with the same angle β of the central axes 151*ac* to 151*ic* irradiate the same light-irradiation region. Note that the narrow-angle light source parts with the same angle β are not positioned exactly in the same position in each group, but because difference in the positions of the narrow-angle light source parts in each group is small enough for the distance between the narrow-angle light source part and the light-irradiation surface 160 (see FIG. 10A), the positions of the narrow-angle light source parts in each group is small enough, so that the narrow-angle light source parts with the same angle β of the central axes 151*ac* to 151*ic* can irradiate the same light-irradiation region.

For example, in any groups, the narrow-angle light source part 30*a* irradiates the light-irradiation region 40*a* and the narrow-angle light source part 30*b* irradiates the light-irradiation region 40*b*. Therefore, in the light-irradiation region 40*a*, irradiation light from twelve of the narrow-angle light source parts 30*a* included in the twelve of the group 31 are overlapped, and in the light-irradiation region 40*b*, irradiation light from twelve of the narrow-angle light source parts 30*b* included in the twelve groups are overlapped the narrow-angle light sources 30*b* in each of the twelve groups of the narrow-angle light sources 30*b* overlap. The above can be applied in a similar manner in the light-irradiation regions 40*c* to 40*i*.

The wide-angle light source part 30*j* is wide-angle, so it can irradiate a greater region 40*j* than the light-irradiation regions 40*a*-40*i*.

A group 32 of wide-angle light source parts (see FIG. 5) includes nine wide-angle light source parts 30*j* of the same configuration, and four of the group 32 are employed. Therefore, at the irradiation region 40*j*, irradiated light from 36 wide-angle light source parts 30*j* overlap.

As shown in FIG. 11, the light-irradiation regions 40*a*-40*i* are located inside (inward) the irradiated area 40*j*, and the light-irradiation region 40*e* is located in the middle of the light-irradiation region 40*j*. The light-irradiation regions 40*a* to 40*i* are partly overlapping between adjacent light-irradiation regions.

The light emitting device 10 is configured to create a desired light distribution pattern by controlling the illuminance of the light in each of the light-irradiation regions, 40*a* to 40*j*, according to respective duty ratios. Furthermore, in regions where the light-irradiation regions overlap, the illuminance increases compared to non-overlapping regions, such that the overlap of these light-irradiation regions can be used to control the light distribution.

Overlap of Light-Irradiation Regions

In the present embodiment, various light distribution patterns can be easily formed by properly overlapping the light-irradiation regions by a plurality of light source parts. More specifically, the overlapping of the light-irradiation regions can be properly achieved by ensuring that the irradiation light from the first and second light source parts, two of the plurality of light source parts, satisfy the condition (1) below:

$$\theta \leq \alpha \leq \tan^{-1}\{2\tan(\theta)\} \quad (1)$$

In the condition (1), θ represents an angle between an imaginary straight line connecting a position of center of a light-irradiation region on a light-irradiation surface of the irradiation light emitted from each of the at least one first light source part and a center of the first light emitting surface of the first light source part, and an imaginary straight line connecting a position on the light-irradiation surface having an illuminance of at least one-half of an illuminance at center position of the corresponding one of the at least one first light source part and the center of the first light emitting surface of the first light source part. Also, α represents an angle between the imaginary straight line connecting the position of center of the light-irradiation region on the light-irradiation surface of the irradiation light emitted from the corresponding one of the at least one first light source part and the center of the first light emitting surface of the corresponding one of the at least one first light source part, and an imaginary straight line connecting a position of center of a light-irradiation region on a light-irradiation surface of the irradiation light emitted from each one of the at least one second light source part and a center of the second light emitting surface of the second light source part.

A relationship between the condition indicated by the condition (1) and the irradiation light and the light-irradiation region will be described below using an example in which the first light source part is the narrow-angle light source part $30e$ and the second light source part is the narrow-angle light source part $30f$.

Figure 12A:
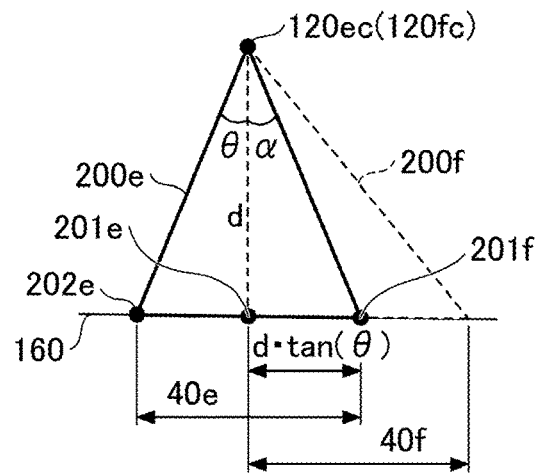
FIGS. 12A to 12C are diagram illustrating an overlapping of the light-irradiation region at a first boundary condition, where
Figure 12B:
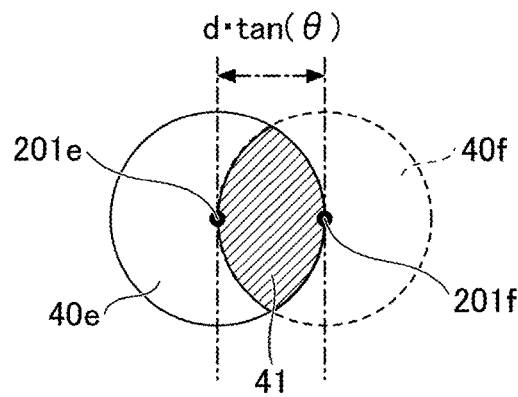
Figure 12C:
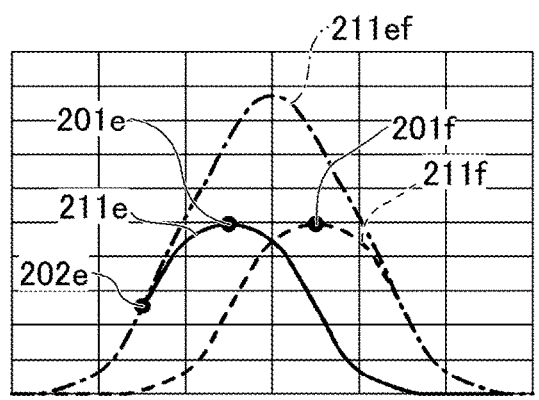

FIGS. 12A to 12C are diagrams illustrating an overlapping of the light-irradiation regions at the first boundary condition (θ=α) of the condition (1), where FIG. 12A illustrates the overlapping of the irradiation light, FIG. 12B is a plan view illustrating an overlapping of the light-irradiation regions, and FIG. 12C illustrates a cross-sectional illuminance distribution in the light-irradiation regions.

FIG. 12A illustrates irradiation of light from the narrow-angle light source parts $30e$ and $30f$, in which the light $200e$ from the center position $120ec$ of the LED $120e$ in the narrow-angle light source part $30e$ irradiates the light-irradiation region $40e$ on the light-irradiation surface $160$, and the light $200f$ from the center position $120fc$ of the LED $120f$ in the narrow-angle light source part $30f$ irradiates the light-irradiation region $40f$ on the light-irradiation surface $160$. The irradiation light $200e$ corresponds to the irradiation light from the first light source part, and the irradiation light $200f$ corresponds to the irradiation light from the second light source part.

The LED $120f$ corresponds to the "second light emitting element" and the narrow-angle light guide member $151f$ provided with the narrow-angle light source part $30f$ corresponds to the "second light-guide member".

The center position $120ec$ of the LED $120e$ and the center position $120fc$ of the LED $120f$ are not arranged at exactly the same position, but the difference in the two positions is much smaller than the irradiation distance d to the light-irradiation surface $160$, so that in FIG. 12A, the center position $120ec$ and the center position $120fc$ are illustrated superimposed. The center position $120ec$ corresponds to the "center position of the first light source part" and the center position $120fc$ corresponds to the "center position of the second light source part".

The position of center of light-irradiation region $201e$ is the position of center of light-irradiation region at the light-irradiation surface $160$ of the irradiation light $200e$, and the ½ illuminance position $202e$ is the position of half the illuminance at center position at the light-irradiation surface $160$ of the irradiation light $200e$. The angle between the imaginary straight line connecting the position at ½ illuminance $202e$ and the central position $120ec$ and the imaginary straight line connecting the illuminance at center position $201e$ and the center position $120ec$ corresponds to the angle θ. Note that the illuminance at center position $201$ of the narrow-angle light source part $30e$ corresponds to the position directly below (immediately below) the narrow-angle light source part $30e$, such that it can also be referred to as the downlight illuminance position. The position of center of light-irradiation region $201e$ corresponds to the position of center of light-irradiation region of the irradiation light from the first light source part at the light-irradiation surface of the first light source part, and the position at ½ illuminance $202e$ corresponds to the position of half the illuminance at center position.

The position of center of light-irradiation region $201f$ is the illuminance at center position at the light-irradiation surface $160$ of the irradiation light $200f$. The angle between the imaginary straight line connecting the position of center of light-irradiation region $201e$ and the central position $120ec$ and the imaginary straight line connecting the position of center of light-irradiation region $201f$ and a center $120fc$ corresponds to the angle α. The position of center of light-irradiation region $201f$ corresponds to the illuminance at center position of the irradiation light from the second light source part at the light-irradiation surface.

For the first boundary condition, angle α is equal to angle θ. The distance between the position of center of light-irradiation region $201e$ and the position of center of light-irradiation region $201f$ is d·tan(θ). The overlap between the light-irradiation region $40e$ and the light-irradiation region $40f$ is as shown in FIG. 12B in the overlap region $41$ shown by the diagonal hatching.

In FIG. 12C, the cross-sectional illuminance distribution $211e$ shows the distribution of cross-sectional illuminance through the position of center of light-irradiation region $201e$ at the irradiation region of $40e$. The cross-sectional illuminance distribution $211f$ shows the cross-sectional illuminance distribution through the position of center of light-irradiation region $201f$ at the irradiation region of $40f$. The combined illuminance distribution $211ef$ shows the cross-sectional illuminance distribution obtained by the result of the synthesized (combined) distribution of $211e$ and $211f$ of the cross-sectional illuminance distribution. In the first boundary condition, the overlap between the light-irradiation region $40e$ and the light-irradiation region $40f$ results in a large composite of illuminance compared to the light-irradiation region $40e$ and the light-irradiation region $40f$ in the overlap region $41$.

Figure 13A:
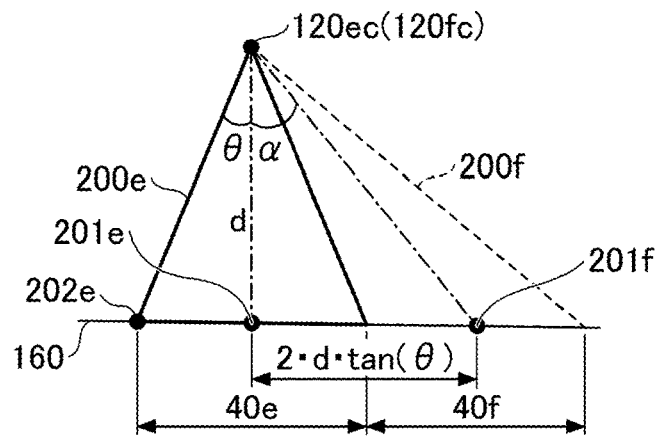
FIGS. 13A to 13C are diagram illustrating an overlapping of the light-irradiation regions at a second boundary condition, where
Figure 13B:
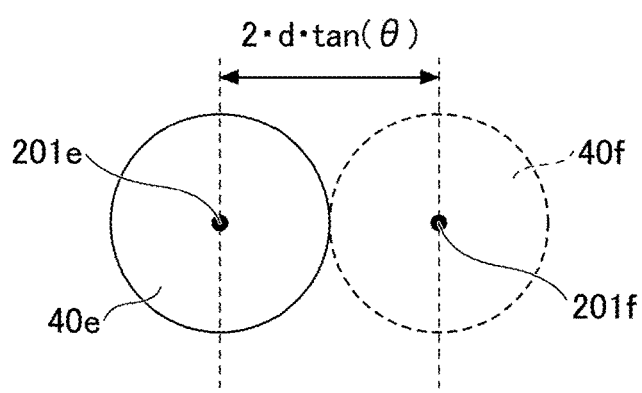
Figure 13C:
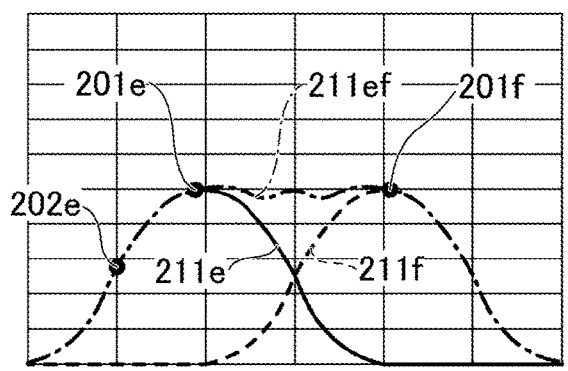

FIGS. 13A to 13C are diagrams illustrating an overlapping of the light-irradiation region at the second boundary condition indicated by the condition (1) ($\alpha = \tan^{-1}\{2 \tan(\theta)\}$), where FIG. 13A illustrates the overlapping of the irradiation light, FIG. 13B is a plan view illustrating an overlapping of the light-irradiation regions, and FIG. 13C illustrates a sectional illuminance distribution in the light-irradiation region. Viewing of the figures can be made in a similar manner as to FIGS. 12A to 12C, so that the duplicate descriptions will be omitted where appropriate.

For the second boundary condition, the angle α is equal to $\tan^{-1}\{2 \tan(\theta)\}$. The distance between the position of center of light-irradiation region $201e$ and the position of center of light-irradiation region $201f$ is $2d \tan\theta$. In this case, as shown in FIG. 13A and FIG. 13B, the light-irradiation region $40e$ and the light-irradiation region $40f$ are circumscribed with each other.

Because of the circumscribed state, the region between the position of center of light-irradiation region $201e$ and the position of center of light-irradiation region 201f does not have a larger synthesized illuminance compared to the illuminance of the irradiation region 40e and the light-irradiation region 40f, as shown in FIG. 13C. However, because light below ½ illuminance is synthesized, the composite illuminance distribution 211ef in the region between the position of center of light-irradiation region 201e and the position of center of light-irradiation region 201f is approximately equal to the illuminance of the light-irradiation region 40e and the illuminance of the light-irradiation region 40f, resulting in an almost uniform distribution.

The overlap of the light-irradiation regions 40e and 40f shown in FIG. 12A to FIG. 13C can be adjusted by the inclination between the central axis 151ec of the narrow-angle light guide member 151e in the narrow-angle light source part 30e and the central axis 151fc of the narrow-angle light guide member 151f in the narrow-angle light source part 30f In this case, the inclination between the central axis 151ec and the central axis 151fc is equal to the angle α in the condition (1). Therefore, the overlap of the light-irradiation regions 40e and 40f can be corrected by determining the inclination between the central axis 151ec and the central axis 151fc to satisfy the condition (1).

Adjusting of the overlap of the light-irradiation regions 40e and 40f can be obtained other than adjusting the inclination between the central axis 151ec and the central axis 151fc. Other adjustments such as providing refractive index distribution in the light guide members can also be applied.

Light Distribution Simulation Results

Next, Light distribution simulation under irradiated light conditions will be illustrated in reference to FIG. 14A through FIG. 17E. The simulation results shown below are obtained by using the narrow-angle light source part 30e as the first light source part and the narrow-angle light source part 30f as the second light source part. The result of each simulation is shown as a set of a contour line display of illuminance distribution, an X-section illuminance distribution and a Y-section illuminance distribution is shown as a single set.

Figure 14A:
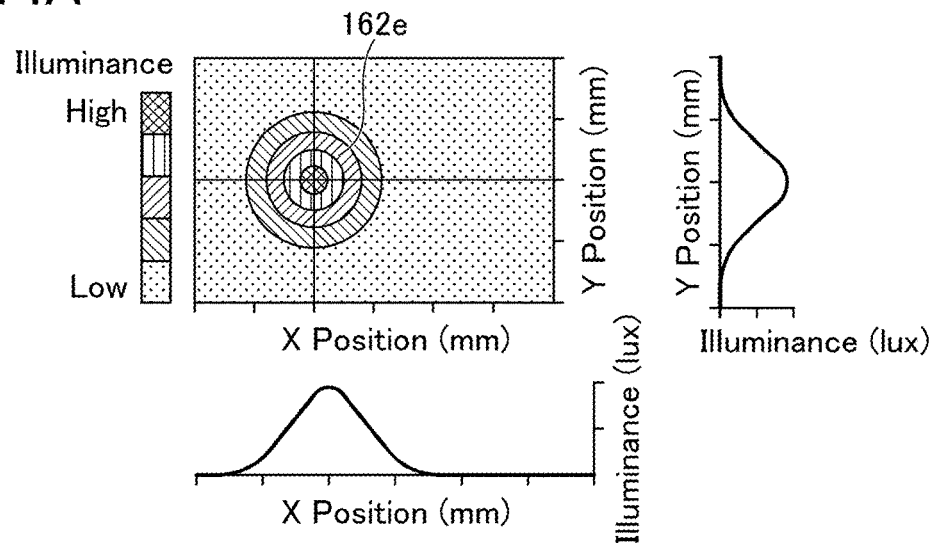
FIGS. 14A to 14C are diagrams each showing a simulated illuminance distribution of a first example.
Figure 14B:
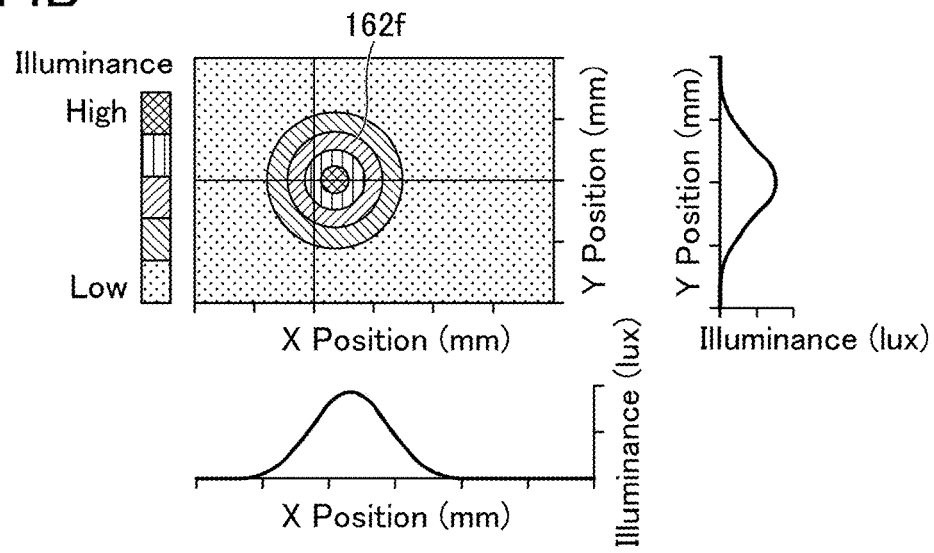
Figure 14C:
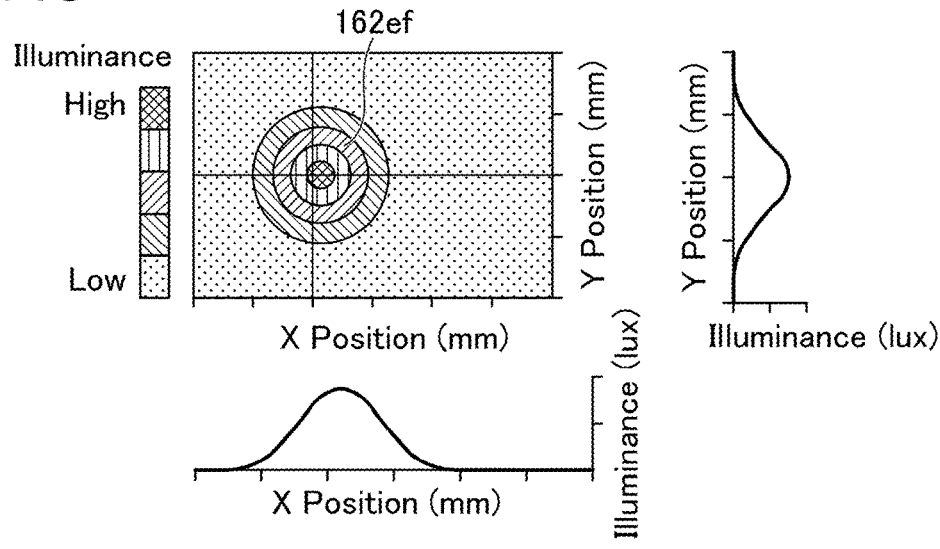

FIG. 14A to FIG. 14C are diagrams illustrating light distributing simulation results with α<θ, where the condition (1) are not satisfied.

FIG. 14A shows an illuminance distribution 162e at the light-irradiation surface 160 by the narrow-angle light source part 30e, and FIG. 14B shows an illuminance distribution 162f at the light-irradiation surface 160 by the narrow-angle light source part 30f FIG. 14C illustrates a light distribution pattern 162ef as a composite intensity distribution, obtained by superimposing the light-irradiation region 40e by irradiation light with a duty ratio of 50.0% using the narrow-angle light source part 30e and the light-irradiation region 40f by irradiation light with a duty ratio of 50.0% using the narrow-angle light source part 30f.

As shown in FIGS. 14A and 14B, the center position of the illuminance distribution 162f is shifted in the X direction with respect to the illuminance distribution 162e. However, a particular change is not exhibited in the pattern of the illuminance distribution 162f relative to the illuminance distribution 162e.

As a result, the difference in the light distribution pattern 162ef relative to the illuminance distribution 162e and the illuminance distribution 162f is decreased, as shown in FIG. 14C. Therefore, adjusting the duty ratio of the narrow-angle light source part 30e and the narrow-angle light source part 30b respectively does not produce a significant change in the light distribution pattern and it is difficult to form a variety of light distributing patterns.

FIG. 15A to FIG. 15D are diagrams illustrating light distributing simulation results where the condition (1) is satisfied and the θ is close to θ. FIG. 14A shows an illuminance distribution 163e at the light-irradiation surface 160 by the narrow-angle light source part 30e, and FIG. 14B shows an illuminance distribution 163f at the light-irradiation surface 160 by the narrow-angle light source part 30f.

FIG. 14C illustrates a light distribution pattern 163ef1 as a composite intensity distribution, obtained by superimposing the light-irradiation region 40e by irradiation light with a duty ratio of 50.0% using the narrow-angle light source part 30e and the light-irradiation region 40f by irradiation light with a duty ratio of 50.0% using the narrow-angle light source part 30f.

Figure 15A:
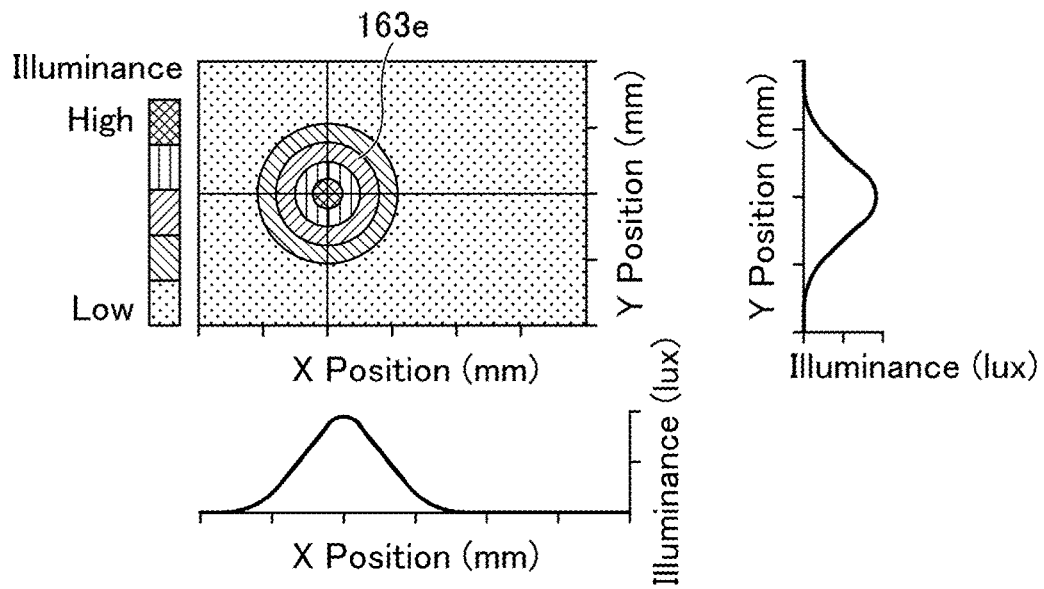
FIGS. 15A to 15D are diagrams each showing a simulated illuminance distribution of a second example.
Figure 15B:
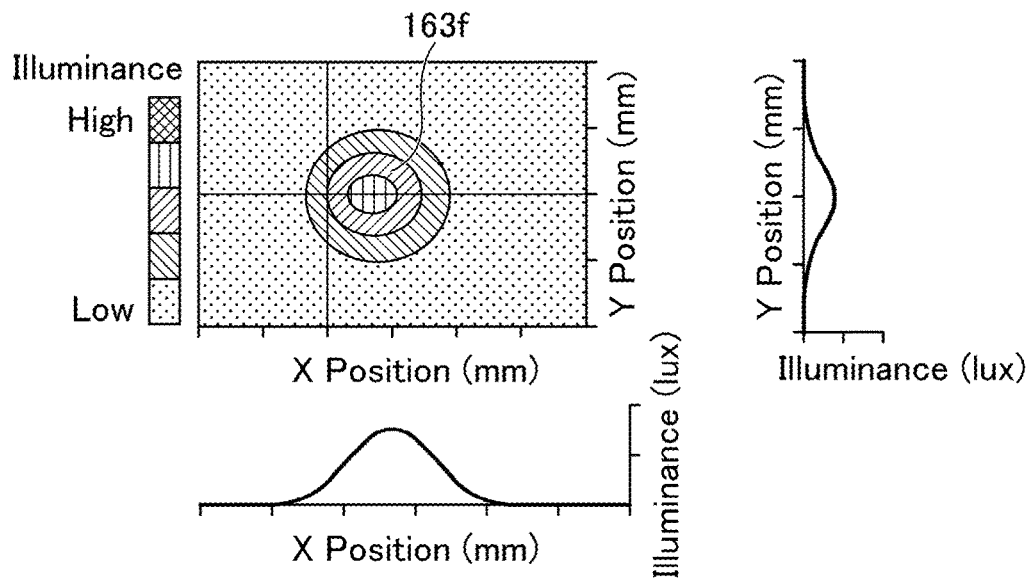
Figure 15C:
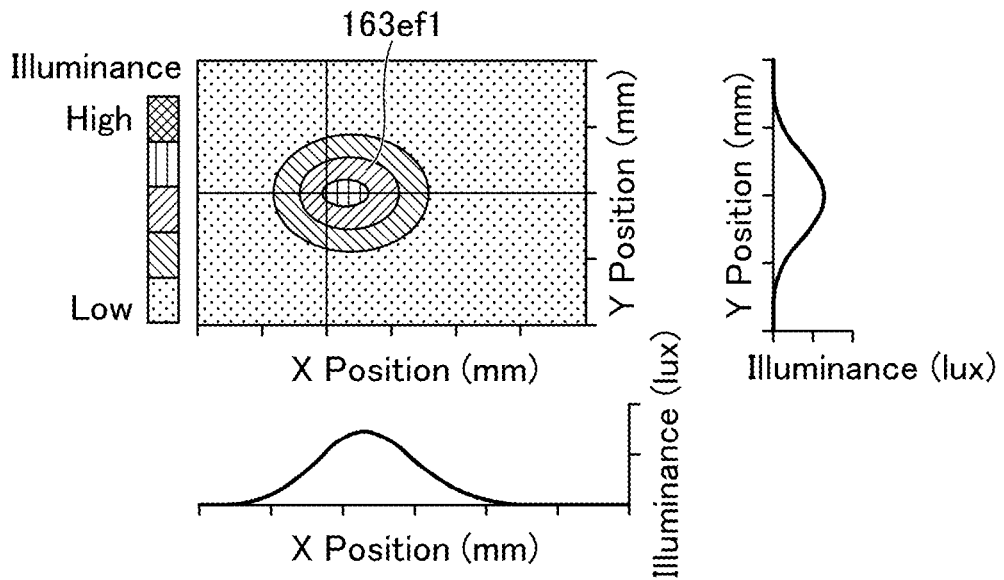
Figure 15D:
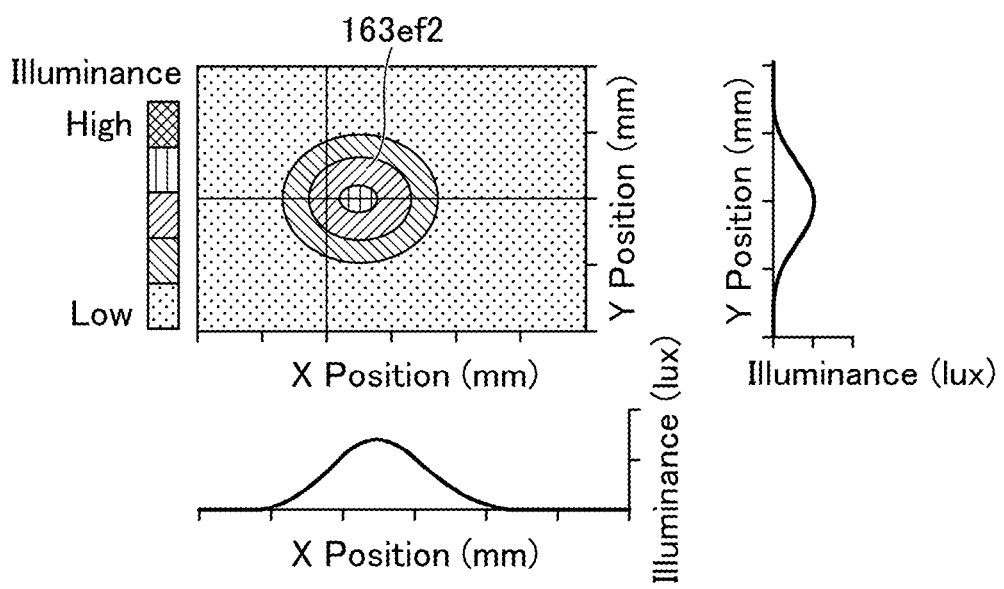

Further, FIG. 15D illustrates a light distribution pattern 163ef2 as a composite intensity distribution, obtained by superimposing the FIG. 15C 40e by irradiation light with a duty ratio of 30.0% using the narrow-angle light source part 30e and the light-irradiation region 40f by irradiation light with a duty ratio of 70.0% using the narrow-angle light source part 30f.

As shown in FIG. 15A and FIG. 15B, the center position of the illuminance distribution 163f is shifted in the X direction with respect to the illuminance distribution 163e. The pattern of the illuminance distribution 163f is elliptical extended in the X direction, and the variation is larger in relation to the circular pattern of the illuminance distribution 162e.

As a result, the difference between the illuminance distribution pattern 163ef1 and the illuminance distribution pattern 163ef2 relative to the illuminance distribution 163e and the illuminance distribution 163f is larger than that shown in FIG. 14C. There is also a difference in pattern according to the duty ratio between the light distribution pattern 163ef1 and the light distribution pattern 163ef2.

Therefore, various light patterns can be formed by adjusting the duty ratio of the narrow-angle light source part 30e and the narrow-angle light source part 30b respectively to alter the light pattern.

Figure 16A:
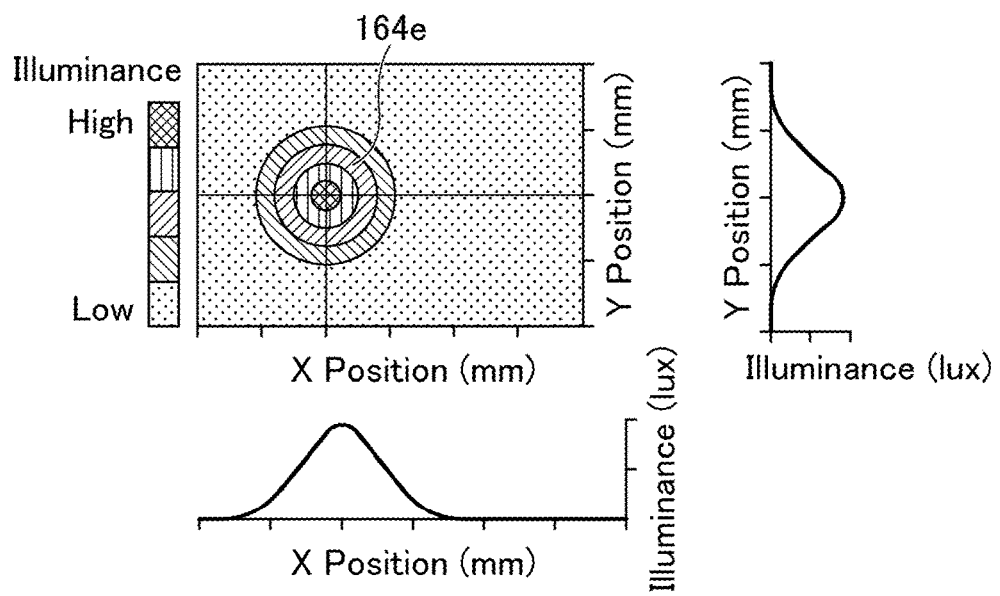
FIGS. 16A to 16E are diagrams each showing a simulated illuminance distribution of a third example.
Figure 16B:
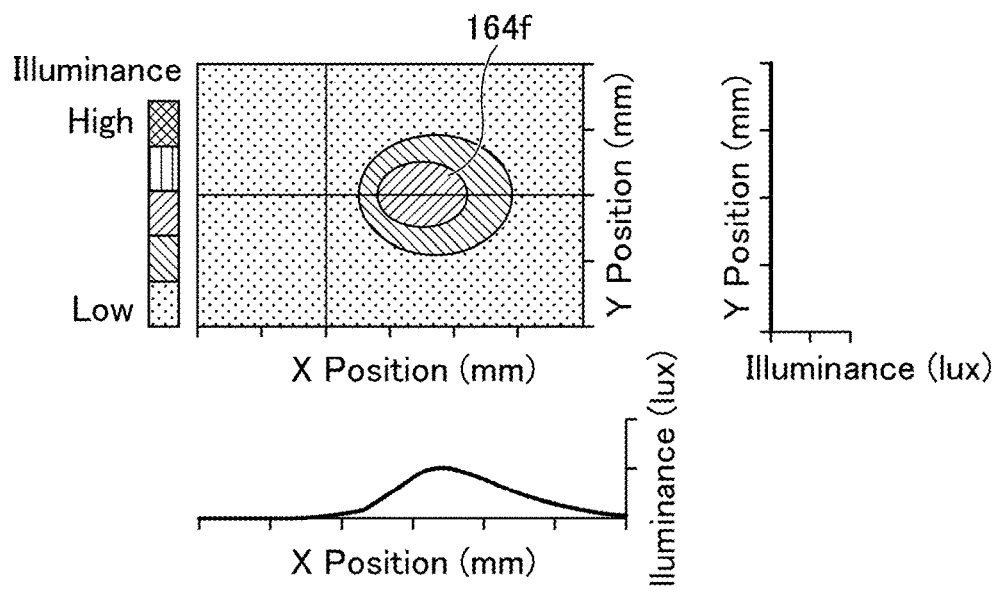

FIGS. 16A to 16E are diagrams each showing a simulated light distribution when the condition (1) is satisfied and the α is close to $\tan^{-1}\{2\tan(\theta)\}$. FIG. 16A shows an illuminance distribution 164e at the light-irradiation surface 160 by the narrow-angle light source part 30e, and FIG. 16B shows an illuminance distribution 164f at the light-irradiation surface 160 by the narrow-angle light source part 30f.

Figure 16C:
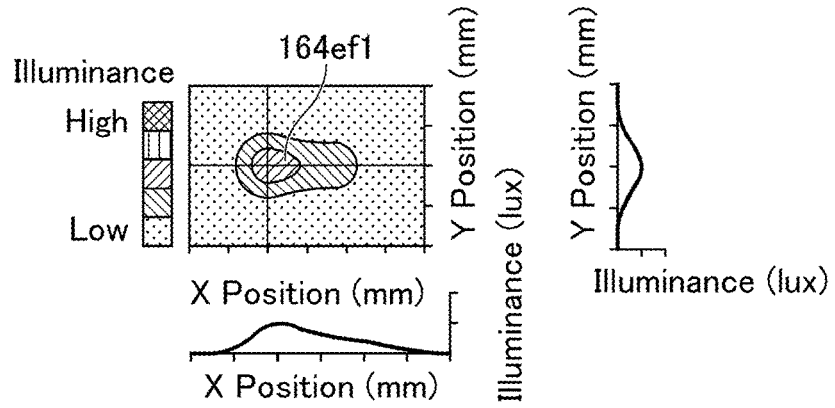

FIG. 16C shows a light distribution pattern 164ef1 as a composite intensity distribution, obtained by superimposing the light-irradiation region 40e irradiated by irradiation light with a duty ratio of 50.0% using the narrow-angle light source part 30e and the light-irradiation region 40f irradiated by irradiation light with a duty ratio of 50.0% using the narrow-angle light source part 30f.

Figure 16D:
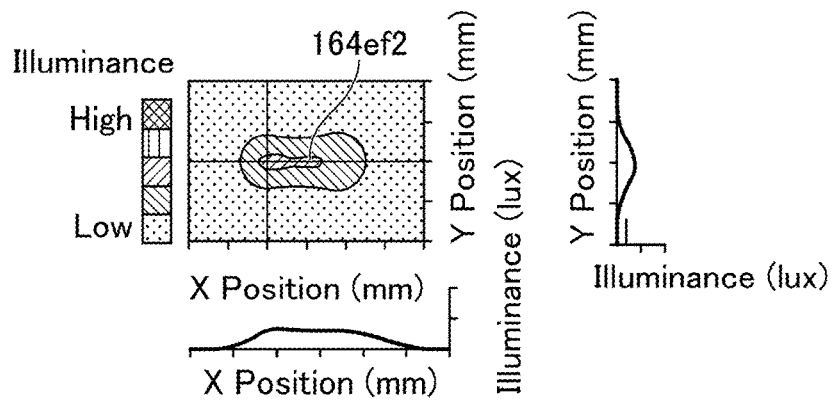

FIG. 16D shows a light distribution pattern 164ef2 as a composite intensity distribution, obtained by superimposing the light-irradiation region 40e irradiated by irradiation light with a duty ratio of 35.4% using the narrow-angle light source part 30e and the light-irradiation region 40f irradiated by irradiation light with a duty ratio of 64.6% using the narrow-angle light source part 30f.

Figure 16E:
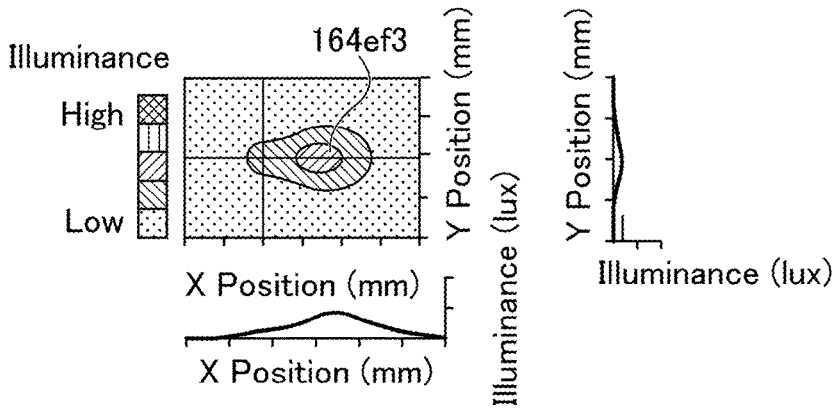

Further, FIG. 16E shows a light distribution pattern 164ef3 as a composite intensity distribution, obtained by superimposing the light-irradiation region 40e irradiated by irradiation light with a duty ratio of 15.0% using the narrow-angle light source part 30e and the light-irradiation region 40f irradiated by irradiation light with a duty ratio of 85.0% using the narrow-angle light source part 30f.

As shown in FIG. 16A and FIG. 16B, the center position of the illuminance distribution 164f is shifted significantly in the X direction with respect to the illuminance distribution 164e. The pattern of the illuminance distribution 164f is elliptical extended in the X direction, and the variation is larger in relation to the circular pattern of the illuminance distribution 164e.

As a result, as shown in FIGS. 16C, 16D, and 16E, the difference among the light distribution patterns 164ef1 to 164ef3 for the illuminance distribution 164e and the illuminance distribution 164f is even greater compared to the light distribution pattern 162ef shown in FIG. 14C. Also, the difference the difference among the light distribution patterns 164ef1 to 164ef3 is greater according to the duty ratios.

Therefore, various light distribution patterns can be formed by adjusting the duty ratio of the narrow-angle light source part 30e and the narrow-angle light source part 30b respectively to alter the light distribution pattern.

Figure 17A:
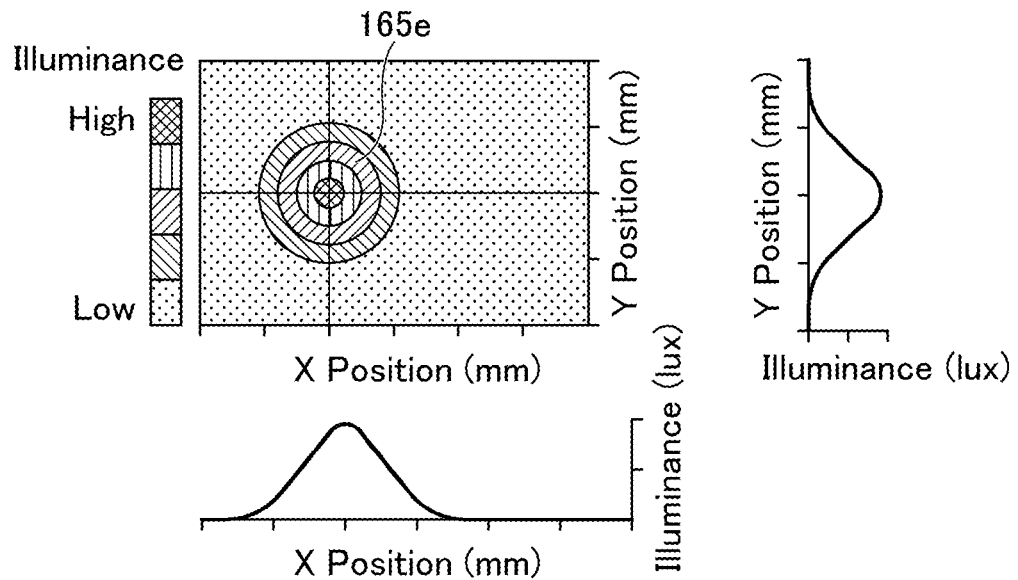
FIGS. 17A to 17E are diagrams each showing a simulated illuminance distribution of a fourth example.
Figure 17B:
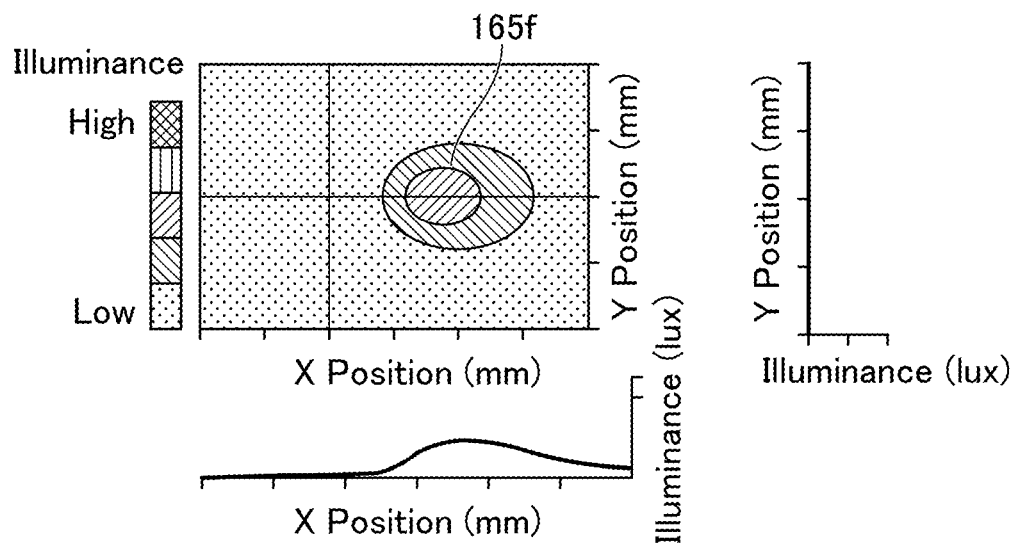

FIG. 17A to FIG. 17E are diagrams illustrating light distributing simulation results with $\alpha > \tan^{-1}\{2\tan(\theta)\}$, where the condition (1) is not satisfied. FIG. 17A shows an illuminance distribution 165e at the light-irradiation surface 160 by the narrow-angle light source part 30e, and FIG. 17B shows an illuminance distribution 165f at the light-irradiation surface 160 by the narrow-angle light source part 30f.

Figure 17C:
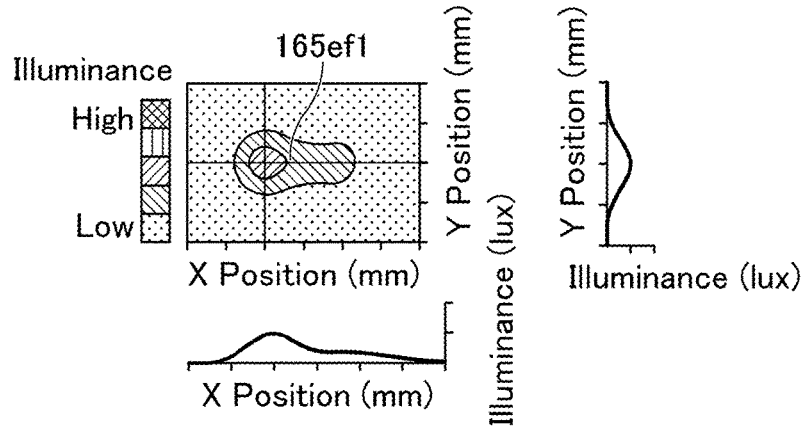

FIG. 17C shows a light distribution pattern 165ef1 as a composite intensity distribution, obtained by superimposing the irradiation region 40e irradiated by irradiation light with a duty ratio of 50.0% using the narrow-angle light source part 30e and the irradiation region 40f irradiated by irradiation light with a duty ratio of 50.0% using the narrow-angle light source part 30f.

Figure 17D:
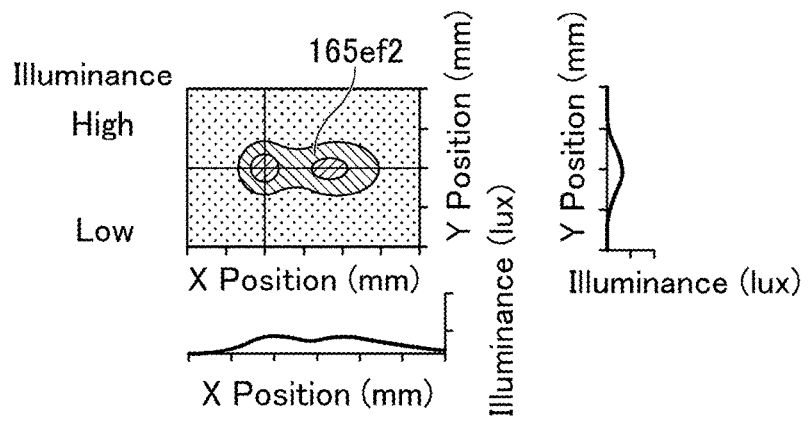

FIG. 17D shows a light distribution pattern 165ef2 as a composite intensity distribution, obtained by superimposing the light-irradiation region 40e irradiated by irradiation light with a duty ratio of 28.3% using the narrow-angle light source part 30e and the light-irradiation region 40f irradiated by irradiation light with a duty ratio of 71.7% using the narrow-angle light source part 30f.

Figure 17E:
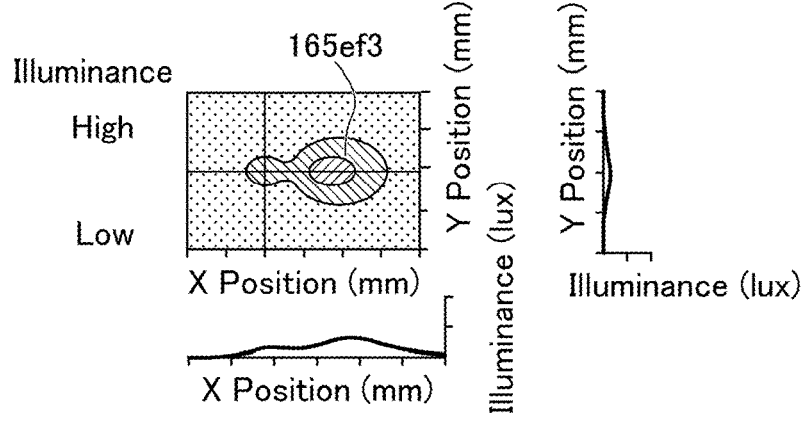

Further, FIG. 17E shows a light distribution pattern 165ef3 as a composite intensity distribution, obtained by superimposing the light-irradiation region 40e irradiated by irradiation light with a duty ratio of 15.0% using the narrow-angle light source part 30e and the light-irradiation region 40f irradiated by irradiation light with a duty ratio of 85.0% using the narrow-angle light source part 30f.

As shown in FIG. 17A and FIG. 17B, the center position of the illuminance distribution 165f is shifted significantly in the X direction with respect to the illuminance distribution 165e. The pattern of the illuminance distribution 165f is elliptical extended in the X direction, and the variation is larger in relation to the circular pattern of the illuminance distribution 165e. Meanwhile, the peak illuminance of 15 [lux] of the illuminance distribution 165f has decreased by less than half compared to the peak illuminance of 37 [lux] of the illuminance distribution 165e.

As a result, as shown in FIGS. 17C, 17D, and 17E, the illuminance distribution of 165e becomes dominant in the light distribution patterns 165ef1 to 165ef3, and the illuminance distribution 165e is separated from the illuminance distribution 165f. Therefore, adjusting the duty ratio of the narrow-angle light source part 30e and the narrow-angle light source part 30b respectively changes the illuminance of the illuminance distribution 165e dominant and does not alter the light distribution patterns 165ef1 to 165ef3 itself significantly. As a result, it is difficult to form a variety of light distribution patterns.

As described above, when the condition (1) is satisfied, adjustment of the duty ratio can form a variety of light distribution patterns, but when the condition (1) is not satisfied, a variety of light distribution patterns is difficult to form by adjusting the duty ratio.

The examples shown in FIG. 14A through FIG. 17E illustrate only the use of the two main areas: the narrow-angle light source part 30e and the narrow-angle light source part 30f, but the same applies to the overlap of the light-irradiation regions of other narrow-angle light source parts.

Controlling the duty ratios of the different narrow-angle light source parts 30a to 30i and the wide-angle light source part 30j in different arrangements allows for more diverse light distribution patterns to be formed.

Examples of Various Types of Light Distribution Patterns

Next, simulation results of various light distribution patterns will be described.

Before illustrating simulation results of light distribution patterns, a corresponding table that shows the relationship between the types of light distribution patterns and the duty ratio of light emission. Table 1 below shows an example of a corresponding table showing the relationship between the types of light distribution patterns and the duty ratio of light emission per light-irradiation region. Table 1 shows the corresponding table 180, which is stored in the storage part 22 (see FIG. 6).

TABLE 1

| Type of Light Distribution Pattern Irradiation Region | Top hat | Twin Peaks | Spread | Wall wash |
|---|---|---|---|---|
| | | Duty ratio | | |
| 40a | 50 | | | 15 |
| 40b | | 100 | | 15 |
| 40c | 50 | | | 15 |
| 40d | | | 100 | 30 |
| 40e | | | 50 | 30 |
| 40f | | | 100 | 30 |
| 40g | 50 | | | 60 |
| 40h | | 100 | | 60 |
| 40i | 50 | | | 60 |
| 40j | | | | 15 |

As shown in Table 1, the corresponding table 180 contains the types of light distribution patterns: top hat and twin peaks, spread and duty ratio information for wall wash.

The top hat is a rectangular light distribution pattern that reduces the irradiation peak and reduces the intensity difference between the regions. The twin peaks are also a light distribution pattern with irradiated peaks in two directions. Spread is an elliptical light distribution pattern with a horizontal spread of intensity. The wall wash is a uniform light distribution pattern from top to bottom along the gravitational direction when irradiated to the wall.

Depending on the type of light distribution pattern, the corresponding table 180 specifies the duty ratio of light emission in each region of the light-irradiation regions of 40a to 40j (see FIG. 11). Note that the type of light distribution pattern may be identified not only by the name of the light distribution pattern, but also by the identification number and the identification symbol.

The control part 2 of the light emitting device 10 determines the duty ratio in each region of the light-irradiation regions 40a to 40j (see FIG. 11), referring to the corresponding table 180, based on these types of light distribution patterns. Various types of light distribution patterns can be formed by controlling the light-irradiation of the narrow-angle light source parts 30a-30i and the wide-angle light source part 30j based on the determined duty ratios.

Figure 18A:
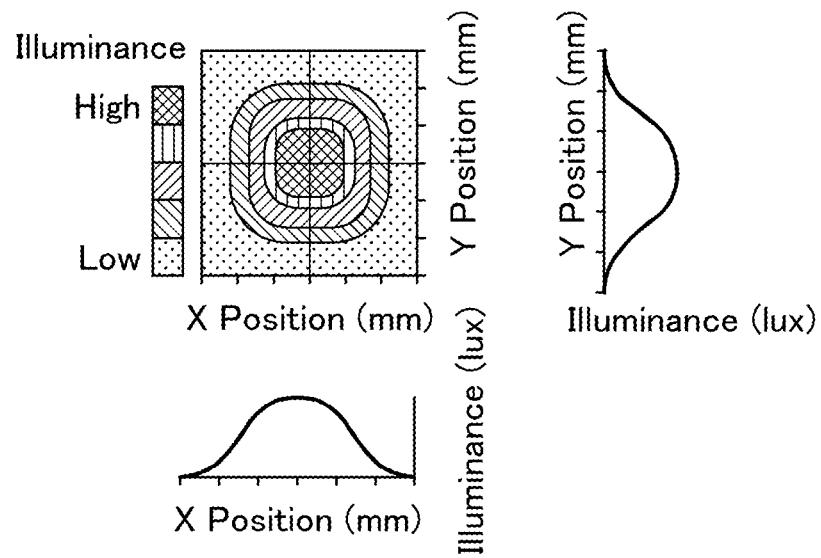
FIGS. 18A to 18E are diagrams respectively showing simulated illuminance distribution patterns.
Figure 18B:
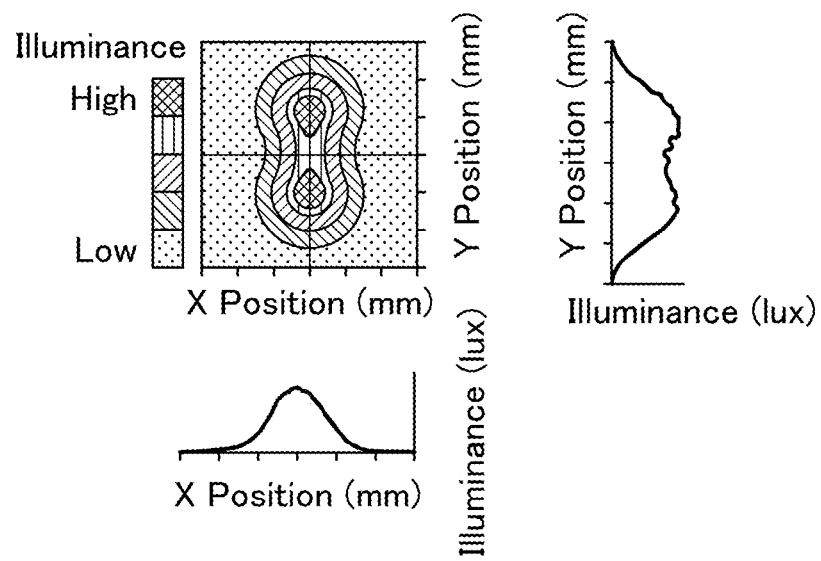
Figure 18C:
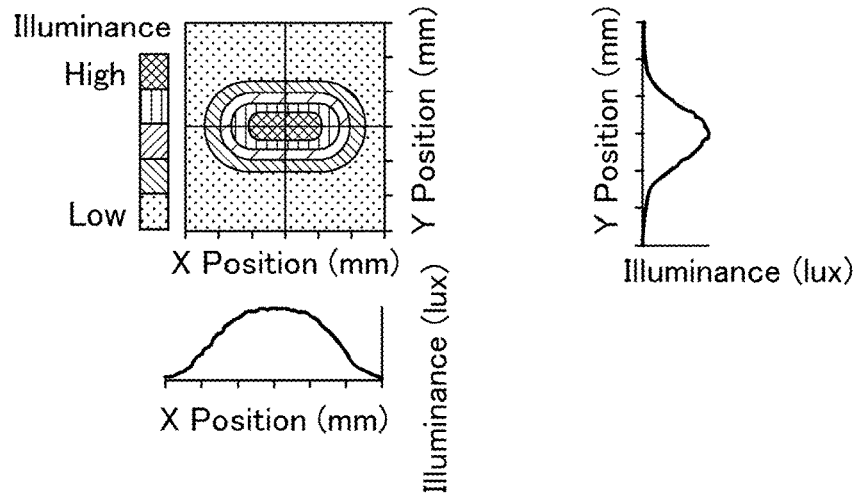
Figure 18D:
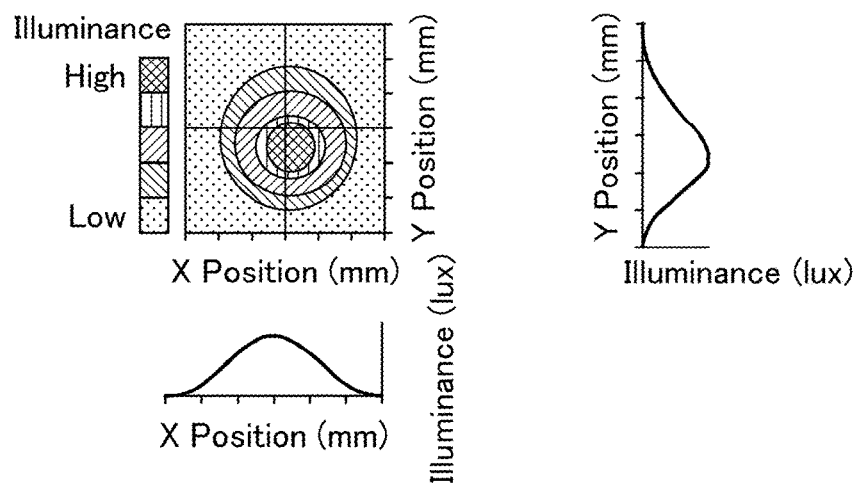
Figure 18E:
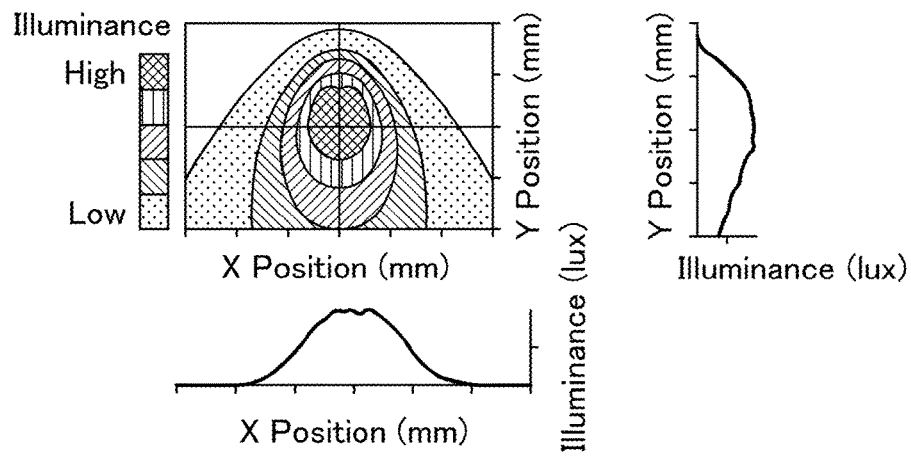

Next, FIGS. 18A to 18E are diagrams showing simulation results of various light distribution patterns. FIG. 18A is an example of a top hat spread pattern, FIG. 18B is an example of a twin peak pattern, and FIG. 18C is an example of a spread pattern. FIG. 18D is an example of a wall wash distribution pattern irradiated on the floor, and FIG. 18E is an example of a wall wash distribution pattern irradiated on the wall.

The simulation results shown in FIGS. 18A to 18E show the light distribution patterns formed by the narrow-angle light source parts 30a-30i and the wide-angle light source part 30j, respectively, according to the corresponding table 180 (see Table 1). For a single simulation result, a contour display of the intensity distribution, an X-section intensity distribution, and a Y-section intensity distribution are shown as one set.

As shown in FIGS. 18A to 18E, varying the duty ratio at each light-irradiation region can form various types of light distribution patterns.

Effects

Next, effects of the light emitting device 10 will be described.

Light emitting devices that control the distribution of light to walls, floors, signs, etc. for space creation in stores/facilities have been known to form various light distribution patterns by combining multiple light emitting devices and by attaching a dedicated light conversion filter and lens for light distribution according to the type of light distribution pattern to the light emitting device.

However, with conventional equipment, installation and replacement of light emitting devices can be time-consuming, and it may be difficult to easily form a variety of light distribution patterns depending on the space requirements.

The light emitting devices equipped with a plurality of light emitting devices and a plurality of light-conducting components that direct the light emitted by each light emitting element. The light-conducting component is shaped in a tapered shape so that each side of the light-emitting material spreads from the light-incident surface toward the light-exiting surface. However, the light emitted from these light emitting elements may not overlap properly at the position on the light-irradiation surface, making it difficult to form a variety of light distribution patterns with simple control.

In the present embodiment, of the narrow-angle light source parts 30a-30i and the wide-angle light source part 30e, the narrow-angle light source part 30e (the first light source part) includes the LED 120e (first light emitting element) and the narrow-angle light guide member 151e (first light guide member), and the narrow-angle light source part 30f (second light source part) includes the LED 120f (second light emitting element) and the narrow-angle light guide member 151f (second light guide member). The narrow-angle light guide member 151e is also formed in a tapered shape that becomes narrower as it approaches LED 120e, and the narrow-angle guide member 151f is formed in a tapered shape that becomes narrower as it approaches LED 120f, and the irradiation light from the narrow-angle light source part 30e and the narrow-angle light source part 30f are configured to satisfy the condition (1) shown above.

When the irradiation light irradiated from the narrow-angle light source part 30e and the narrow-angle light source part 30f satisfy the condition (1), the light-irradiation region 40e by the narrow-angle light source part 30e and the light-irradiation region 40f by the narrow-angle light source part 30e can be overlapped. This makes it possible to easily form a variety of light distribution patterns with simple control that only varies the duty ratio of the luminescence.

In the present embodiment, it is not necessary to combine multiple light emitting devices or to attach a dedicated photodistribution filter or a lens for light distribution if a new light emitting device is installed at a store/facility or if the light distribution pattern of an existing light emitting device is changed according to the spatial arrangement. Therefore, the installation or replacement of light emitting devices can be shortened, and the cost of light emitting devices can be reduced.

An example of this is when the light distribution pattern is changed by controlling the duty ratio of the light emission. However, instead of the duty ratio of the light emission, changing the light distribution pattern by controlling the drive voltage of the LED as a light emitting element or the drive current of the LED as a light emitting element can have the same effect as described above.

However, by controlling the duty ratio of light emission, the dimming pattern can be changed by keeping the LED drive voltage or drive current in a constant state, and the dimming can be controlled with simple and low power consumption.

In the present embodiment, the control part 2 controls each of the three light source parts 30 by determining the duty ratio of light emission according to the type of light distribution pattern and referring to the corresponding table 180. This makes it possible to easily form a variety of light distribution patterns according to the type of light distribution pattern.

Further, in the present embodiment, the central axis 151ec (first central axis) of the narrow-angle light guide member 151e (first light guide member) is tilted with respect to the central axis 151fc (second central axis) of the narrow-angle light guide member 151f (second light guide member). This arrangement allows for a reduction in the number of operations such as adjusting the positions of light guide materials and light emitting elements and easily realize a configuration and positioning that satisfy the condition (1) shown above. If the inclination between the central axis 151ec and the central axis 151fc is configured to equal (1) the angle α in the condition (1), the conditions can be satisfied more easily, and therefore more suitable.

Also, in the present embodiment, the light source part 30 includes the narrow-angle light source parts 30a-30i and the wide angle light source part 30j (third light source part). Each of the narrow-angle light source parts 30a-30i is configured to emit light with a divergence angle of about 12.5 degrees (first divergence angle), and the wide-angle light source part 30j is configured to emit light with a divergence angle of about 30 degrees (second divergence angle). In other words, the divergence angle of the light emitted from each of the narrow-angle light guide members 151a to 151i is about 12.5 degrees (first divergence angle) and the light emitted from each of the wide-angle light guide members 152j is about 30 degrees (second divergence angle).

The use of the wide-angle light source part 30j enables light to be directed to a wider area than the use of the narrow-angle light source parts 30a-30i only.

It is also preferable that an angular difference η between the first divergence angle of irradiation light from each of the narrow-angle light source parts 30a to 30i and the second divergent angle of irradiation light from the wide-angle light source part 30*j* satisfies the condition (2) shown below.

$$\eta > \alpha \quad (2)$$

The angle α in the condition (2) is angle formed by the imaginary straight line connecting the position of center of light-irradiation region of the irradiation light from the first light source part on the light-irradiation surface and the center position of the first light source part and the imaginary straight line connecting the position of center of light-irradiation region of the irradiation light from the second light source part on the light-irradiation surface and the center position of the second light source part. The angular difference η is also the difference between the first divergence angle and the second divergence angle.

Figure 19:
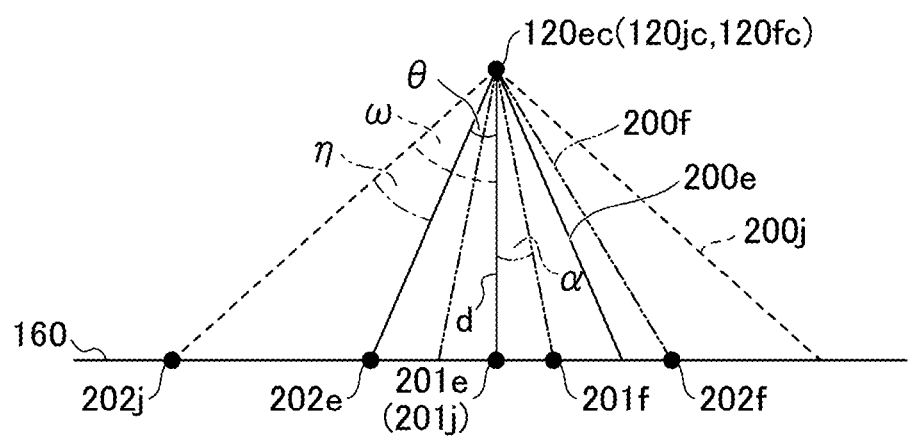
FIG. 19 is a diagram illustrating differences in divergence angles of irradiation light between a narrow-angle light source part and a wide-angle light source part.

FIG. 19 illustrates the difference in angle between the first divergence angle of the irradiation light from the narrow-angle light source part 30*e* (first light source part) and the second divergence angle of the irradiation light from the wide-angle light source part 30*j* (third light source part).

FIG. 19 illustrates that irradiation light 200*e* from the central position 120*ec* of the LED 120*e* of the narrow-angle light source part 30*e* irradiates the light-irradiation surface 160, irradiation light 200*f* from the central position 120*fc* of the LED 120*f* at the narrow-angle light source part 30*f* irradiates the light-irradiation surface 160, and irradiation light 200*j* from the central position 120*jc* of the LED 120*j* at the wide angle light source part 30*j* irradiates the light-irradiation surface 160. The irradiation light 200*e* corresponds to the irradiation light from the 30*e*, the irradiation light 200*f* corresponds to the irradiation light from the narrow-angle light source part 30*f*, and the irradiation light 200*j* corresponds to the irradiation light from the wide-angle light source part 30*j*.

The central position 120*ec* of the LED 120*e*, the center position 120*fc* of the LED 120*f*, and the center position 120*jc* of the LED 120*j* are not exactly the same position relative to the light-irradiation surface 160, but the difference between these positions is small enough for the radiation distance d to the light-irradiation surface 160. For this reason, the center positions 120*ec*, 120*fc*, and 120*jc* are shown superimposed in FIG. 19.

The angle θ formed by the line connecting the position of center of light-irradiation region 201*e* and the position of center of light-irradiation region 120*ec* and the line connecting the position at ½ illuminance 202*e* and the central position 120*ec* corresponds to the first divergence angle. The angle formed by the line connecting the illuminance at center position 201*e* and the central position 120*ec* and the line connecting the illuminance at center position 201*f* and the central position 120*fc* corresponds to the angle α.

The position of center of light-irradiation region 201*j* is the central illumination position on the light-irradiation surface 160 of the irradiation light 200*j*, and the position at ½ illuminance 202*j* is the position on the light-irradiation surface 160 where the illuminance of the irradiation light 200*j* is a half of the illuminance at center position. Although the position of center of light-irradiation region 201*j* and the position of center of light-irradiation region 201*e* are not exactly the same position relative to the light-irradiation surface 160, the difference between the two positions is small enough with respect to the irradiation distance d to the irradiation surface 160, so that in FIG. 19, the central illumination position 201*j* and the position of center of light-irradiation region 201*e* are shown superimposed.

The angle ω formed by the line connecting the position of center of light-irradiation region 201*j* and the central position 120*jc* and the line connecting the position at ½ illuminance 202*j* and the central position 120*jc* corresponds to the second divergence angle.

When the narrow-angle light source part 30*f* irradiate the irradiation surface with the divergence angle θ and a tilt angle α, and the angle ω is greater than θ+α, the light-irradiation region of the narrow-angle light source part 30*f* is included in the light-irradiation region of the wide-angle light source part 30*i*. Such that irradiation light from the wide-angle light source part 30*j* and irradiation light from the narrow-angle light source part 30*f* overlap. Therefore, if the above condition (2) that indicates the angular η is greater than the angle α, is satisfied, the irradiation light from the wide-angle light source part 30*j* and the irradiation light from the narrow-angle light source part 30*f* overlap. For example, the first divergence angle of 12 degrees and the second divergence angle of 30 degrees gives the angular difference η of 17.5 degrees, which is greater than the angle α of 14 degrees, and thus satisfies the condition (2).

Satisfying the condition (2) allows overlapping of the light-irradiation regions 40*a* to 40*i* of the narrow-angle light source parts 30*a* to 30*i* within the light-irradiation region 40*i* of the wide-angle light source part 30*j*, thereby increasing the diversity of the light distribution patterns.

In the present embodiment, the narrow-angle light guide members 151*a*-151*i* and the wide-angle light guide members 152*j* are made of a material that includes a resin containing light-scattering particles. This arrangement can improve scattering of light that is guided therethrough, and by improving the scattering of light, uneven illuminance of the irradiation light from the light emitting device 10 can be reduced.

Further, in the present embodiment, the light emitting device 10 includes one or more white LEDs 121 configured to emit white light, and one or more incandescent lamp color LEDs 122 configured to emit light of incandescent lamp color. By changing the illuminance ratio of light between white light and light of incandescent lamp color, the diversity of the light distribution patterns can be further improved.

In addition to the white color and incandescent lamp color, the light emitting device 10 can be equipped with LEDs or other light emitting elements such as semiconductor laser elements, configured to emit light of various colors. By increasing the color diversity of light emitted by light emitting elements, it is possible to form more diverse light distribution patterns.

Variational Examples

In the embodiments described above, an example of a configuration where the distance between the central axis of the narrow-angle light guide member 151*e* (the first light guide member) and the central axis of the narrow-angle light guide member 151*d* (the second light guide member) 151*dc* (the second central axis) is greater at the light emitting side than at the light incident side, but according to variational examples, the distance between the axes can be made greater at the light incident side than that of the light emitting side.

Figure 20A:
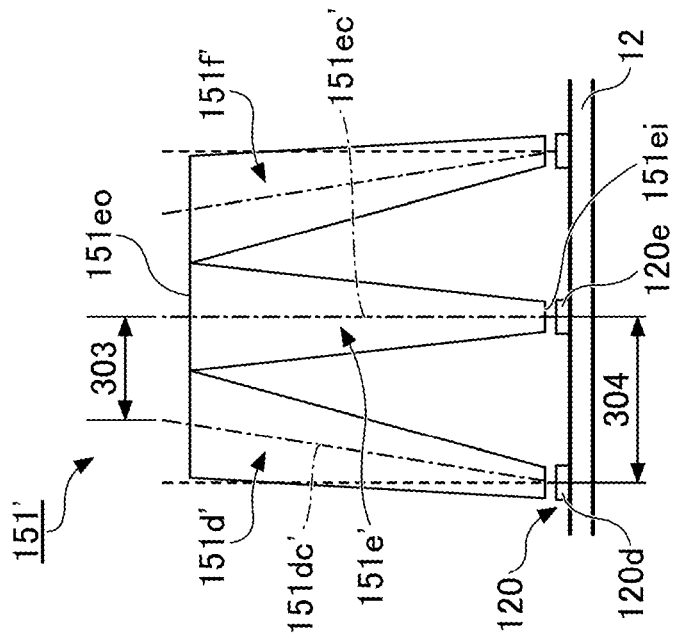
FIGS. 20A and 20B are diagrams each showing a variational example of a narrow angle light guide member, where
Figure 20B:
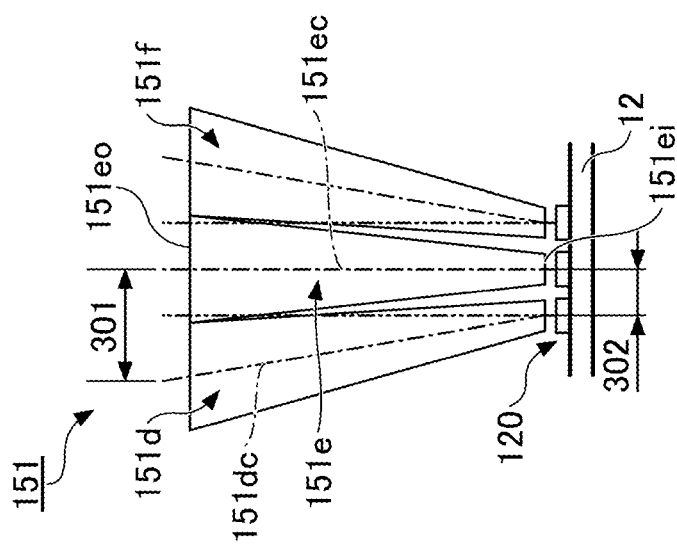

FIGS. 20A and 20B are diagrams illustrating an example of the configuration of the narrow-angle light guide member according to variational examples. FIG. 20A illustrates a configuration in which the distance between the central axis 151*ec* and the central axis 151*dc* is greater at the light emitting side than at the light incident, and FIG. 20B illustrates a configuration in which the distance between the central axis 151*ec* (the first central axis) and the central axis 151*dc* (the second central axis) is greater at the light incident side than at the light emitting side.

FIG. 20A is a schematic cross-sectional view of the narrow-angle light guide member array 151 taken along the direction of arrows A-A in FIG. 3A. FIG. 20B is a schematic cross-sectional view of a narrow-angle light guide member array 151' according to a variational example, the portion corresponding to that taken along the direction of arrows A-A in FIG. 3A.

In the narrow-angle guide member array 151, as shown in FIG. 20A, the distance 301 between the central axis 151*ec* and the central axis 151*dc* at the light emitting side is greater than the distance 302 between the central axis 151*ec* and the central axis 151DC at the light incident side. The light emitting side is the side on which the light-exiting surface 151*eo* is formed, and the light incident side is the side on which the light incident surface 151*ei* is formed.

Meanwhile, in the narrow-angle light guide member array 151', as shown in FIG. 20B, the distance between the central axis 151*ec*' and the central axis 151DC' at the light incident side is greater than the distance between the central axis 151*ec*' and the central axis 151DC' at the light emitting side.

FIG. 20B shows a cross-sectional view of only the narrow-angle light guide members 151*d*', 151*e*' and 151*r* in the narrow-angle light guide member array 151', but the axis-to-axis distance at the light incident side of the other narrow-angle light guide members in the narrow-angle light guide member array 151' is larger than that of the light emitting side.

The narrow-angle light guide member array 151' allows the light irradiated in the same light-irradiation region as shown in FIG. 11. However, positive/negative of the angle β becomes opposite to that of the narrow-angle light guide member array 151, the light from the narrow-angle light guide member 151*d*' irradiates the light-irradiation region 40*f* and the light from the narrow-angle light guide member 151*f* irradiates the light-irradiation region 40*d*.

The distance between LED 120*d* and LED 120*e* can be increased by increasing the distance between the central axis at the light incident side than the light emitting side. Accordingly, effect of heat or the like between adjacent LEDs can be reduced, which can reduce fluctuation in the illuminance of the irradiation light from the LEDs, and allowing the LEDs to be driven more consistently.

Although the above details the preferred implementation form, etc., it is not restricted to the implementation form mentioned above, and various deformations and substitutions may be made to the implementation form mentioned above without deviating from the scope of the patent claim.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A light emitting device comprising:
a plurality of light source parts each being configured to emit an irradiation light, the plurality of light source parts comprising at least one first light source part, at least one second light source part, and at least one third light source part; wherein
each of the at least one first light source part comprising a first light emitting element having a first light emitting surface and a first light-guiding member configured to guide light emitted from the first light emitting element;
each of the at least one second light source part comprising a second light emitting element having a second light emitting surface and a second light-guiding member configured to guide light emitted from the second light emitting element;
each of the least one third light source part comprising a third light emitting element having a third light emitting surface and a third light-guiding member configured to guide light emitted from the third light emitting element;
with respect to at least one second light source part, a center of a light-exiting surface of the second light-guiding member is positionally shifted from a center of an incident surface of the second light-guiding member;
each of the at least one first light-guiding member having a tapered shape narrowing toward the first light emitting element; and
each of the at least one second light-guiding member having a tapered shape narrowing toward the second light emitting element;
wherein the irradiation light emitted from the first light source part and the irradiation light emitted from the second light source part satisfy the condition (1):

$$\theta \leq \alpha \leq \tan^{-1}\{2\tan(\theta)\} \qquad (1)$$

wherein θ is an angle between an imaginary straight line connecting a position of center of a light-irradiation region on a light-irradiation surface of the irradiation light emitted from each one of the at least one first light source part and a center of the first light emitting surface of the first light source part, the light-irradiation surface being separate and spaced apart from the light emitting device, and the light-irradiation surface being a flat plane surface perpendicular to a first central axis of the first light-guiding member, and an imaginary straight line connecting a position on the light-irradiation surface having an illuminance of at least one-half of an illuminance at center position of the corresponding one of the at least one first light source part and the center of the first light emitting surface of the first light source part, and α is an angle between the imaginary straight line connecting the position of center of the light-irradiation region on the light-irradiation surface of the irradiation light emitted from the corresponding one of the at least one first light source part and the center of the first light emitting surface of the corresponding one of the at least one first light source part, and an imaginary straight line connecting a position of center of a light-irradiation region on a light-irradiation surface of the irradiation light emitted from each one of the at least one second light source part and a center of the second light emitting surface of the second light source part, wherein the second light emitting element of one of the at least one second light source part is positioned on a boundary of the corresponding second light-exiting surface of the corresponding second light-guiding member when viewed in a plan view, and the third light emitting element of the at least one third light source part that is adjacent to the at least one second light source part, is positioned on a boundary of the corresponding third light-exiting surface of the corresponding third light-guiding member when viewed in the plan view.

2. The light emitting device according to claim 1, further comprising a control part for controlling irradiation of light emitted from the plurality of light source parts.

3. The light emitting device according to claim 1, wherein a first central axis of the first light-guiding member is inclined with respect to a second central axis of the second light-guiding member.

4. The light emitting device according to claim 1, wherein the plurality of light source parts further comprises at least one third light source part, the at least one first light source part and the at least one second light source part are configured to emit light with a first divergence angle, and the at least one third light source part is configured to emit light with a second divergence angle that is different from the first divergence angle.

5. The light emitting device according to claim 1, wherein the at least one first light-guiding member or the at least one second light-guiding member or both the at least one first light-guiding member and the at least one second light-guiding member is made of a resin containing light dispersing particles.

6. The light emitting device according to claim 1, wherein
each of the plurality of light source parts includes a plurality of lateral surfaces, and
the plurality of lateral surfaces of adjacent light source parts are not in contact with each other.

7. The light emitting device according to claim 1, wherein
each of the first light source part and the second light source part comprises a light emitting diode.

8. The light emitting device according to claim 1, further comprising:
a light guide member array including the first light source part and the second light source part.

9. The light emitting device according to claim 2, wherein the control part comprises a determining part to determine a duty ratio of light emission for each of the plurality of light source parts, based on a type of light distribution pattern.

10. The light emitting device according to claim 2, wherein
the control part includes a light distribution information acquisition part, a storage part, a determining part, and an irradiation control part.

11. The light emitting device according to claim 3, wherein a distance between the first central axis and the second central axis at an emission side is greater than at an incident side.

12. The light emitting device according to claim 3, wherein a distance between the first central axis and the second central axis at an incident side is greater than at an emission side.

13. The light emitting device according to claim 4, wherein an angular difference 11 between the first divergence angle and the second divergence angle satisfies a condition (2)

$$\eta > \alpha \qquad (2).$$

14. The light emitting device according to claim 7, wherein
each light emitting diode of the first light source part and the second light source part is a white light emitting diode or light bulb color light emitting diode.

15. The light emitting device according to claim 8, wherein
the light guide member array comprises a glass material or a resin material.

16. The light emitting device according to claim 8, further comprising:
a light guide holding member configured to hold the light guide member array.

* * * * *

UNITED STATES PATENT AND TRADEMARK OFFICE
CERTIFICATE OF CORRECTION

PATENT NO. : 11,880,016 B2
APPLICATION NO. : 17/223531
DATED : January 23, 2024
INVENTOR(S) : Yoshinori Shinohara et al.

It is certified that error appears in the above-identified patent and that said Letters Patent is hereby corrected as shown below:

In the Claims

Column 28, Line 27, Claim 1:
Change:
"$\theta \leq \alpha \leq \tan\text{-}1\ \{2\tan(\theta)\}$ (1)"
To:
--$\theta \leq \alpha \leq \tan^{-1}\ \{2\tan(\theta)\}$ (1)--

Signed and Sealed this
Twenty-third Day of April, 2024

Katherine Kelly Vidal
*Director of the United States Patent and Trademark Office*